United States Patent
Langus et al.

(10) Patent No.: US 9,043,240 B2
(45) Date of Patent: May 26, 2015

(54) SYSTEMS, APPARATUS AND METHODS FOR MOBILE COMPANION PREPAID CARD

(71) Applicant: MasterCard International Incorporated, Purchase, NY (US)

(72) Inventors: Jeffrey Langus, Rye Brook, NY (US); Venu Appana, Edison, NJ (US); Rajen S. Prabhu, Singapore (SG)

(73) Assignee: MasterCard International Incorporated, Purchase, NY (US)

(\*) Notice: Subject to any disclaimer, the term of this patent is extended or adjusted under 35 U.S.C. 154(b) by 0 days.

(21) Appl. No.: 14/186,283

(22) Filed: Feb. 21, 2014

(65) Prior Publication Data
US 2014/0244496 A1 Aug. 28, 2014

Related U.S. Application Data

(60) Provisional application No. 61/768,249, filed on Feb. 22, 2013.

(51) Int. Cl.
*G06Q 40/00* (2012.01)
*G06Q 20/36* (2012.01)
*G06Q 20/28* (2012.01)
*G06Q 20/40* (2012.01)
(Continued)

(52) U.S. Cl.
CPC .......... *G06Q 20/3674* (2013.01); *G06Q 20/28* (2013.01); *G06Q 20/4018* (2013.01); *G06Q 20/18* (2013.01); *G06Q 20/20* (2013.01); *G06Q 20/3255* (2013.01); *G06Q 20/34* (2013.01); *G06Q 20/36* (2013.01); *G06Q 20/425* (2013.01)

(58) Field of Classification Search
CPC ....... G06Q 10/00; G06Q 20/00; G06Q 30/00; G06Q 40/00
USPC ........................................................ 705/3–44
See application file for complete search history.

(56) References Cited

U.S. PATENT DOCUMENTS 6,918,537 B2 \* 7/2005 Graves et al. ................. 235/379
7,581,674 B2 \* 9/2009 Cohen et al. .................. 235/380
(Continued)

OTHER PUBLICATIONS

"PCT Notification of Transmittal of the International Search Report and the Written Opinion of the International Searching Authority, or the Declaration", dated Aug. 15, 2014, for International Application No. PCT/US2014/017714, 12pgs.

*Primary Examiner* — Frantzy Poinvil
(74) *Attorney, Agent, or Firm* — Buckley, Maschoff & Talwalkar LLC

(57) ABSTRACT

Systems, apparatus and methods for providing an un-personalized and un-embossed mobile companion prepaid card to a consumer having a mobile wallet account. An embodiment includes a wallet provider computer receiving an approval request from an agent device for a mobile companion prepaid card for a consumer. The process includes the wallet provider computer determining an issuer financial institution (FI) associated with the mobile companion prepaid card, transmitting the approval request to an issuer FI processor, receiving an approval message, and transmitting the approval message and a request to a consumer's mobile device to provide cardholder verification met hod (CVM) data. The method also includes receiving and validating the CVM data, transmitting a mobile companion prepaid card activation request, receiving a confirmation message indicating activation, and transmitting a message confirming activation of the mobile companion prepaid card to the consumer's mobile device.

17 Claims, 17 Drawing Sheets

(51) Int. Cl.
*G06Q 20/18* (2012.01)
*G06Q 20/20* (2012.01)
*G06Q 20/32* (2012.01)
*G06Q 20/34* (2012.01)
*G06Q 20/42* (2012.01)

(56) References Cited

U.S. PATENT DOCUMENTS

| | | | |
|---|---|---|---|
| 7,873,573 B2 * | 1/2011 | Realini | 705/39 |
| 8,024,272 B2 * | 9/2011 | Doran et al. | 705/41 |
| 8,103,548 B2 * | 1/2012 | Economy et al. | 705/16 |
| 8,249,965 B2 * | 8/2012 | Tumminaro | 705/35 |
| 8,275,712 B2 * | 9/2012 | Vollmer et al. | 705/41 |
| 2003/0172031 A1 | 9/2003 | Graves et al. | |
| 2007/0125842 A1 * | 6/2007 | Antoo et al. | 235/380 |
| 2011/0166914 A1 | 7/2011 | Dixon et al. | |
| 2012/0005086 A1 | 1/2012 | Pitroda et al. | |
| 2012/0011063 A1 | 1/2012 | Killian et al. | |
| 2012/0173420 A1 * | 7/2012 | Vollmer et al. | 705/41 |
| 2012/0233073 A1 * | 9/2012 | Salmon et al. | 705/44 |
| 2012/0296818 A1 * | 11/2012 | Nuzzi et al. | 705/41 |
| 2012/0310824 A1 | 12/2012 | Liberty | |
| 2012/0317028 A1 | 12/2012 | Ansari | |
| 2013/0060686 A1 * | 3/2013 | Mersky | 705/41 |
| 2013/0066689 A1 * | 3/2013 | Dixon et al. | 705/13 |
| 2014/0138435 A1 | 5/2014 | Khalid | |

* cited by examiner

US 9,043,240 B2

SYSTEMS, APPARATUS AND METHODS FOR MOBILE COMPANION PREPAID CARD

CROSS REFERENCE TO RELATED APPLICATION(S)

This application claims the benefit of U.S. Provisional Patent Application No. 61/768,249 filed on Feb. 22, 2013, the contents of which are hereby incorporated by reference for all purposes.

FIELD OF THE DISCLOSURE

Systems, apparatus and methods are described for providing an un-personalized, un-embossed, low-cost mobile companion prepaid card to a consumer who already has a mobile wallet account. The mobile companion prepaid card product is an open loop instrument that can be linked to a closed loop account and can be used where the open loop instrument is accepted.

BACKGROUND

Consumers are using mobile devices more and more, and the use of mobile telephones in particular is ubiquitous. In fact, in some countries it is common for consumers to utilize mobile telephones to communicate, to pay for goods and/or services, and to transfer funds between family members and/or friends. Thus, methods and apparatus have been developed to provide payment-enabled mobile devices to consumers for their use in making purchases and transferring money. However, current systems operate as closed loop systems wherein all the parties (customers, family members, friends, and merchants) in the system have accounts with a single payment services provider (PSP). In these closed-loop systems, a purchase or payment transaction involves direct transfers between the parties' accounts that are issued by the payment services provider. Therefore, payments can only be made between parties (such as a merchant and a consumer) who belong to the same closed loop system. Such a closed-loop mobile money system has limited utility for end users.

The inventors recognized that there is a need for systems, apparatus and processes for safely, quickly and reliably transfer money between cardholders and merchants and/or family members regardless of the payment system (closed-loop or open-loop) to which the parties belong. There is also a need for such systems, apparatus and processes to facilitate easy access by cardholders to cash at ATM and/or at agent locations through use of a debit operation. In addition, a need exists for a cardholder account that permits consumers to securely and easily conduct point-of-sale (POS) transactions at traditional merchant locations, while also permitting e-commerce transactions.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Figure 1A:
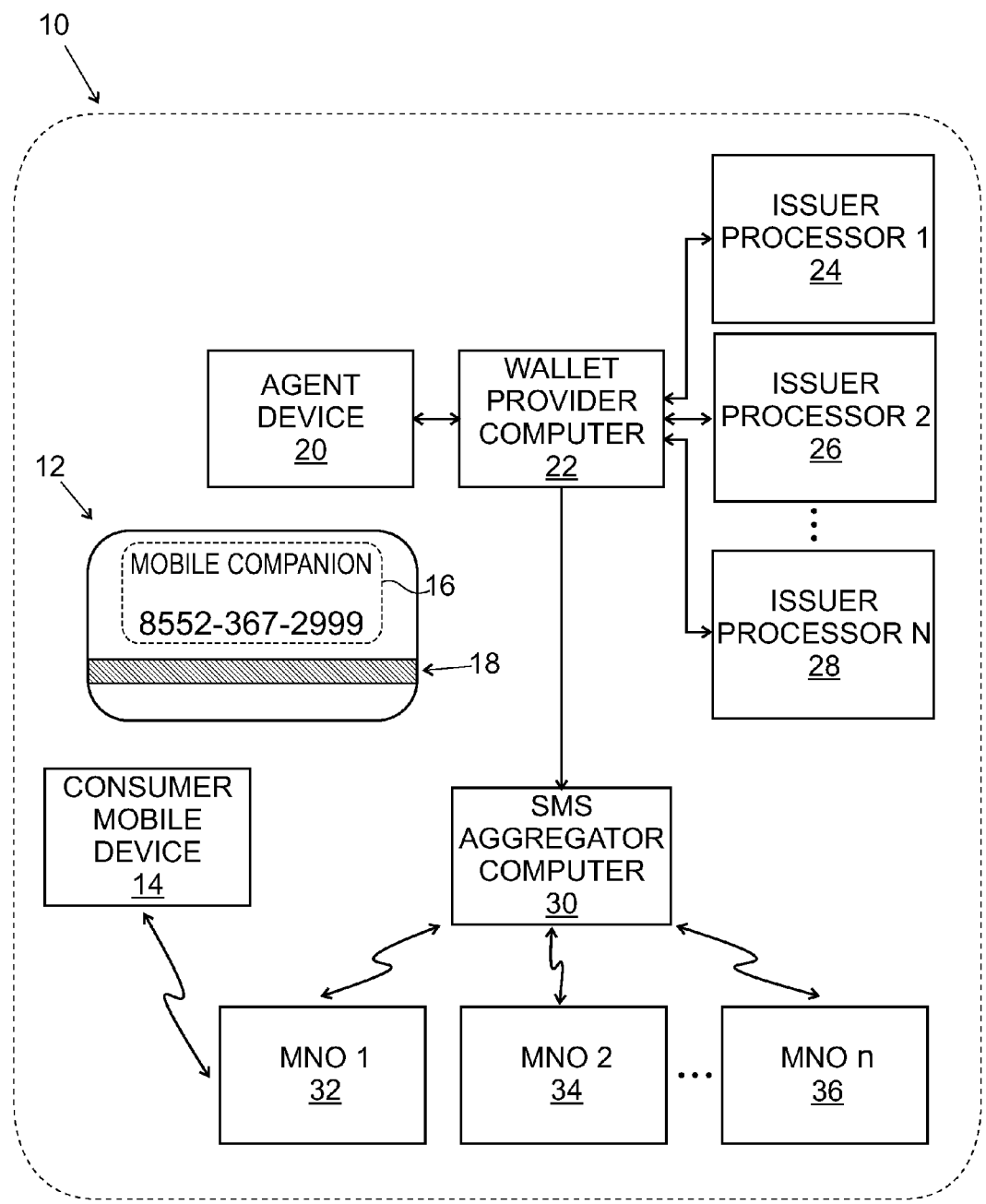
FIG. 1A is a block diagram of a system for providing a mobile companion prepaid card to a consumer having a mobile device according to an embodiment of the disclosure.

In general, and for the purpose of introducing concepts of novel embodiments described herein, provided are systems, apparatus and methods for providing an un-personalized, un-embossed, mobile companion prepaid card to a consumer who already has a mobile wallet account. In some embodiments, the mobile companion prepaid card is low cost, and can be instantly issued by an agent and linked on-the-fly to the consumer's current mobile wallet account (or stored value account (SVA)). A unique and novel feature of this mobile companion prepaid card product is the linking of an open-loop instrument to a closed-loop account to provide the consumer with a prepaid card that can be used wherever such open-loop instruments are accepted. To accomplish this, a novel interface has been provided (as described herein) between the open-loop payment instrument and mobile accounts. As part of a registration process, the mobile companion prepaid card is authenticated by the consumer participating in a cardholder verification method (CVM) in response to an SMS message transmitted to his or her mobile telephone. For example, the consumer may receive an SMS message requesting the consumer to provide, for example, his or her mobile Personal Identification Number (mPIN) and/or a biometric identifier (such as a thumbprint, an iris scan, or an audio response) in response to an SMS message authentication request. After receiving the correct CVM response, such as the correct mPIN, a wallet provider sends an API request to an issuer processor to activate the mobile companion prepaid card. The consumer is informed of the activation, and then he or she can use the mobile companion prepaid card to perform, for example, point of sale (POS), automatic teller machine (ATM), and/or e-Commerce transactions, receive inbound remittances, and send domestic and/or international remittances. The consumer maintains his or her existing stored value accounts (SVAs) housed by the Program Manager, and all consumer life cycle management is delivered through the consumer's mobile device.

In some embodiments, the life cycle management requirements may include a registration process that includes utilizing CVM (for example, the mobile PIN), and then provides SMS confirmation after each transaction. In some embodiments, the holder of a mobile companion prepaid card account can also perform a mobile initiated lock/unlock, initiate a balance inquiry via the mobile phone, initiate a "last X transactions" request via the mobile phone, request "customer service" via the mobile phone, receive an SMS alert a predetermined time before the mobile companion prepaid card expires (for example, two months prior to expiration), receive marketing and/or customer relationship management (CRM) messages via SMS alerts, and/or request SMS opt-out of one or more of the messaging services.

The mobile companion prepaid card is issued by a financial institution (FI) such as an issuing bank (issuer) affiliated with an operator of a payment system network (such as MasterCard International Incorporated, the assignee of the present application) and the mobile network operator (MNO) associated with the consumer's mobile device (or a third party mobile money provider can act as the program manager). Consumers still have SVAs housed by the MNO, however the mobile companion prepaid card (typically a plastic form factor card) also allows consumers to use their mobile money accounts when paying merchants for goods and services (for example, at a POS terminal, at an e-commerce website, Mail Order Telephone Order (MOTO), and obtain cash at ATMs where the mobile companion prepaid card is accepted.

An API connection between the prepaid issuer processor of the credit card account and the wallet provider for the mobile money account (a stored value account or "SVA") is required. The SVA is the system of record and the prepaid processor only holds detailed transaction information for open loop transactions. In addition, in some implementations, when an MNO launches a new mobile money program featuring the mobile companion prepaid card, the MNO may directly issue a mobile money open-loop account without operating a separate stored value account (SVA).

FIG. 1A is a block diagram of a system 10 for providing a mobile companion prepaid card 12 to a consumer having a mobile device 14 according to an embodiment. In some embodiments, the consumer may be required to be physically present at an agent location, such as at a retail store in order to register for and obtain a mobile companion prepaid card. Thus, a consumer (not shown) wishing to obtain a mobile companion prepaid card 12 visits a retail store or other agent location which distributes mobile companion prepaid cards. The agent or retail store may display inactivated mobile companion prepaid cards on a rack (for example, a j-hook on a wall display) or on another type of display to facilitate selection by a consumer. The mobile companion prepaid card 12 is an un-embossed and un-personalized plastic card that includes a primary account number (PAN) 16 and a magnetic stripe 18. In some other embodiments, an integrated circuit (IC) (not shown) may be embedded within the mobile companion prepaid card and may be configured for reading by a reader device (not shown). The mobile companion prepaid card 12 includes a unique reference number and/or an ATM PIN. It should be understood that the mobile companion prepaid card 12 has no value until activated, which can be accomplished by conducting a registration process.

Referring again to FIG. 1A, and continuing with the above example, a representative or agent at the agent location (such as a cashier at a retail store) can use an agent device 20 (such as a laptop computer, desktop computer, or other electronic device having, for example, a wired or wireless internet connection) to link the mobile companion prepaid card 12 on the fly to the consumer's current mobile wallet account. In an implementation, the agent uses the agent device 20 to enter or scan information from the mobile companion prepaid card such as a card reference number, and also enters the consumer's mobile telephone number for transmission to a wallet provider computer 22. If required, the agent uses the agent device to enter "Know Your Customer" (KYC) information of the consumer, and then uses the agent device 20 to transmit that information as well to the wallet provider computer 22. Upon receiving the mobile companion prepaid card information and the consumer information, the wallet provider computer 22 then determines which of a plurality of Issuer processors (Issuer processor1 24, Issuer processor2 26, or Issuer processor3 28) is associated with the prepaid card. A particular Issuer processor may be owned and/or operated by a third party service provider on behalf of (OBO) a particular Issuer financial institution (FI) (such as a bank). Thus, if the wallet provider computer 22 determines that the mobile companion prepaid card information and the consumer information should be transmitted to the Issuer processor1 24, it transmits that information and waits for an approval or authorization message from that issuer. If an approval message is received, the wallet provider computer 22 initiates an approval response with an SMS aggregator computer 30. The SMS aggregator computer 30 determines which of a plurality of mobile network operators (MNOs) 32, 34 or 36, to utilize based on the consumer's mobile telephone number, and then transmits that SMS message to the appropriate MNO 32 which forwards the SMS message to the consumer's mobile device 14. The consumer reads the SMS message, and responds with an appropriate consumer identifier (for example, a mobile personal identification number (mPIN) and/or a biometric identifier), which is transmitted back to the wallet provider computer 22. The wallet provider computer 22 then again contacts the Issuer FI processor 24 with an activation request, receives an activation response, and again contacts the consumer device via SMS message.

Figure 1B:
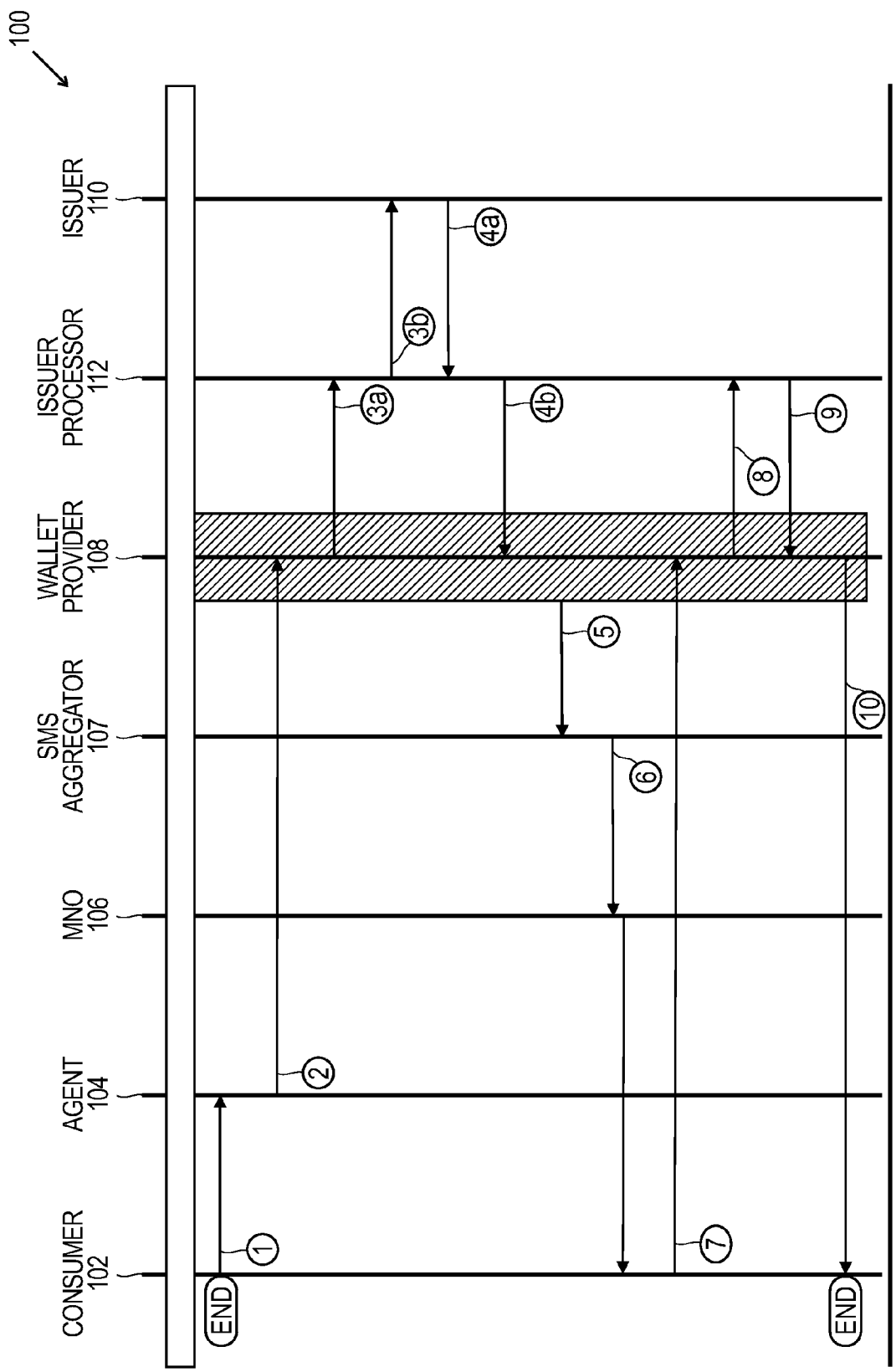
FIG. 1B is a flow diagram illustrating a mobile companion prepaid card registration process for linking a mobile companion prepaid card to the consumer's mobile wallet account according to an embodiment of the disclosure.

FIG. 1B is a flow diagram illustrating a mobile companion prepaid card registration process 100 that enables a consumer 102 to link a mobile companion prepaid card to the consumer's mobile wallet account according to an embodiment. The Consumer 102 brings the un-activated mobile companion prepaid card to an Agent 104. At step 1, in some implementations the Agent obtains Know Your Customer (KYC) information from the consumer 102, the consumer's mobile telephone number, and a reference number from the mobile companion prepaid card. KYC information may include, but are not limited to, information from identification documents issued by a government authority that includes the consumer's photograph, residence address and signature (such as a valid state driver's license or U.S. passport) and depends on local regulations.

Referring again to FIG. 1B, in step 2 the Agent 104 submits or enters the KYC information, mobile telephone number and reference number into a portal application as part of the process to activate the mobile companion prepaid card. (In some embodiments, the KYC information can also be sent to the issuer through other channels which may be required by local regulations.) The portal application then transmits the information to a Wallet Provider 108 which in turn initiates an approval request (which may be a web API call) 3*a* to the issuer processor 112. At step 3*b*, the issuer processor 112 forwards the KYC information and Office of Foreign Asset Control (OFAC) data to the issuer FI 110 for processing, and the issuer processor 112 also identifies the PAN using the reference number of the companion card and marks it as "ready to be activated." In step 4*a*, the Issuer responds with a KYC/OFAC approval message regarding the mobile companion prepaid card (based on the KYC and OFAC information that it received) to the issuer processor 112, which in step 4*b* sends a approval status message (API response) to the Wallet Provider 108 indicating that the consumer can proceed to activate the prepaid card. In step 5, the Wallet Provider then initiates an SMS response message and transmits it to the SMS aggregator 107. The SMS aggregator determines the consumer's MNO and thus directs the SMS response message to the appropriate MNO 106 serving the consumer. The MNO then transmits the SMS message to the consumer's mobile device 102 which includes a request for the consumer to activate the mobile companion prepaid card by performing a cardholder verification method (CVM). The consumer may be required to perform one or more types of CVM which may include one or more of providing a mobile personal identification number (mPIN) and/or providing a biometric identifier (for example, a fingerprint, iris scan and/or audio identifier) in order to complete the activation process.

As depicted in FIG. 1B, in step 7, the consumer confirms enrollment (or completes registration) by completing the cardholder verification method (CVM), which may include providing one or more identifiers (identification data) to the wallet provider 108 to validate in order to activate the mobile companion prepaid card. For example, the consumer may be required to transmit an SMS message to the wallet provider 108 that includes an mPIN (and, in some implementations, the last 4-digits of the PAN) and/or a biometric identifier. The wallet provider then validates and/or confirms the CVM data provided by the cardholder or consumer and then in step 8 the wallet provider transmits a mobile companion prepaid card activation request to the Issuer Processor 112. The Issuer processor 112 then activates the mobile companion card for the consumer and transmits, at step 9, a response confirming activation to the Wallet Provider 108. Lastly, in step 10 the Wallet Provider 108 transmits an SMS activation response to the Consumer 102 (again, this confirmation message is transmitted through the MNO of the consumer) that confirms activation and indicates that the mobile companion card is ready for use.

Figure 2A:
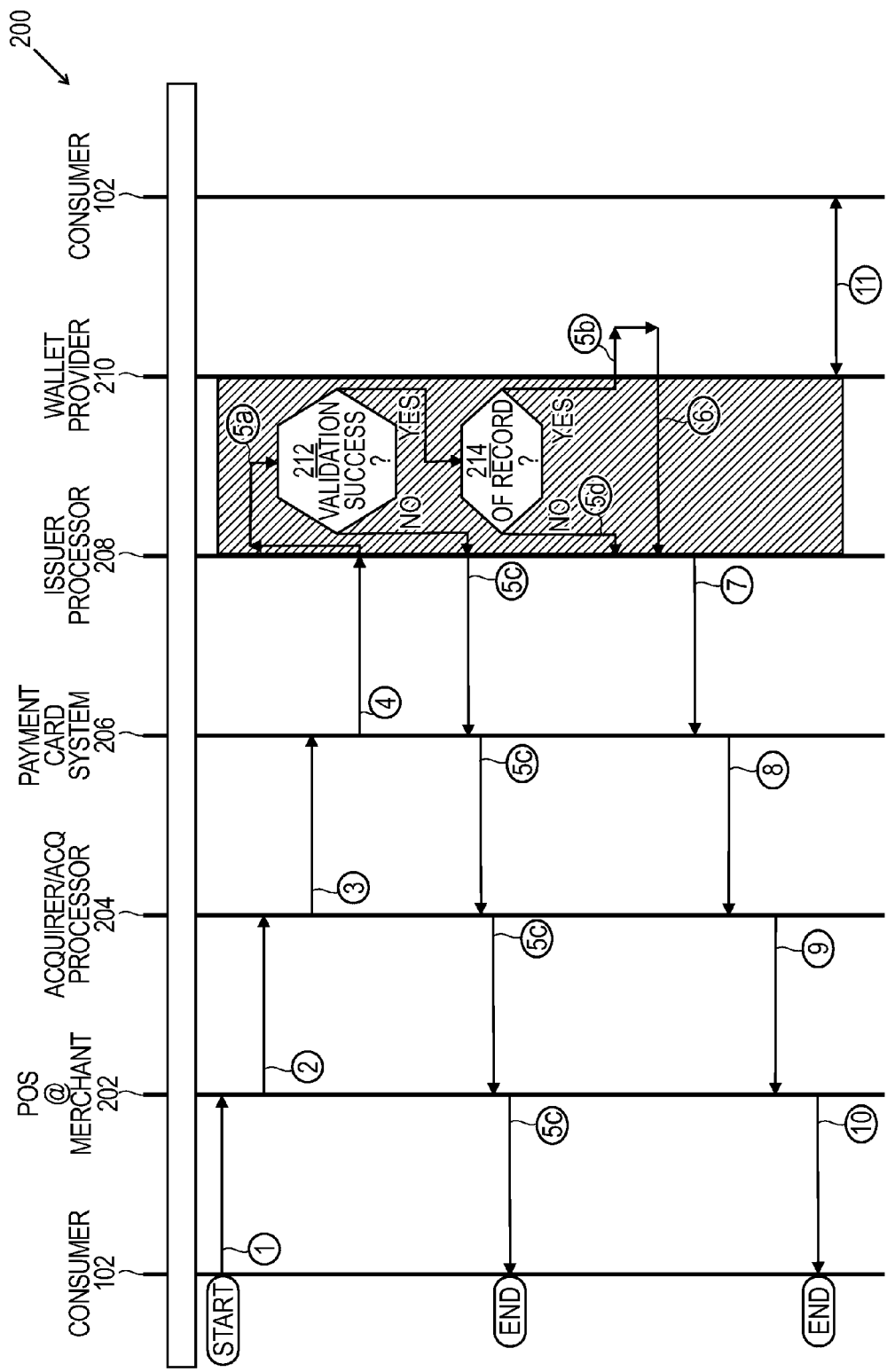
FIG. 2A is a flow diagram illustrating a purchase transaction process for a consumer utilizing a mobile companion prepaid card according to an embodiment of the disclosure.

FIG. 2A is a flow diagram illustrating a mobile companion prepaid card purchase transaction process 200 for a consumer 102 to purchase items or services from a merchant 202 according to an embodiment. In step 1, the Consumer swipes his or her mobile companion prepaid card at a card reader associated with a POS terminal. In step 2, the merchant 202 terminal decodes the magnetic stripe and transmits data to an Acquirer processor 204 that includes mobile companion prepaid card data, a purchase transaction amount and/or other data associated with the purchase transaction. In step 3, the Acquirer processor 204 generates an authorization request that is transmitted to a payment card system 206 (which may be, for example, the well-known Banknet® system operated by the assignee of the present invention) which determines the Issuer financial institution (FI) or issuer bank of the consumer prepaid card in step 4. The payment card system 206 also operates to apply network rules, to perform security validation processes, and if all is in order, approves transmission of a purchase transaction approval request to the Issuer Processor 208 of the Issuer bank. Next, in step 5A, the Issuer Processor 208 performs validation processing 212, and if successful, then checks 214 to see if the wallet provider 210 is the system of record. If so, then the Issuer processor 208 forwards in step 5B the authorization to the Wallet Provider 210 via an API Web request. (In some embodiments, the Issuer bank computer can authorize the transaction on behalf of the wallet provider, and in such cases the flows will change to reflect such authorization. The wallet provider would then receive an updated balance, transaction details and the like from the issuer processor 208 (for authorization, POS and/or e-Commerce transactions, ATM transactions, and the like)).

Referring again to FIG. 2A, in step 5B the Wallet Provider 210 operates to verify the availability of funds, to authorize the transaction, and adjusts the "open to buy" down (for example, debits the consumer's account), and to prepare (per transaction) the most recent account balance. (In some implementations, the Wallet Provider computer 210 transmits (not shown) a message to the consumer's mobile device 102 indicating purchase transaction authorization and/or a most recent account balance.) In step 6, the Wallet Provider 210 responds to the Issuer Processor 208 via the API Web services with an authorization for the transaction, and the Issuer Processor 208 in step 7 responds to the Payment Card Network 206 with a purchase approval message. Next, in step 8 the Payment Card Network 206 sends a response to the Acquirer Processor 204, which in step 9 transmits the authorization message to the Merchant 202 who provides a receipt in step 10 to the Consumer 102. In a retail store environment, the Consumer 102 may then leave the merchant's store with the purchased items. Thus, in some embodiments when there is a successful transaction, the merchant provides the goods or services to the consumer, and the consumer receives an instant receipt and a balance update on his or her mobile device.

Referring again to FIG. 2A, if the Issuer Processor 208 basic validation 212 is not successful, then in step 5C the Issuer Processor transmits a decline message back to the Payment Card Network 206. As shown, the decline message propagates through the Acquirer Processor 204 and the Merchant Terminal 202 to the Consumer 102. In this case, the transaction is denied and the consumer receives the decline message.

In addition, if the validation processing 212 is successful, but the check 214 indicates that the wallet provider 210 is not the system of record, then the Issuer processor 208 in step 5D verifies the availability of funds, authorizes the transaction, adjusts the "open to buy" (for example, debits the consumer's account), and prepares (per transaction) the most recent account balance. The process then continues with step 7, wherein the Issuer Processor 208 transmits a purchase approval message to the Payment Card Network 206. Next, in step 8 the Payment Card Network 206 sends a response to the Acquirer Processor 204, which in step 9 transmits the authorization message to the Merchant 202 who provides a receipt in step 10 to the Consumer 102. As mentioned above, the Consumer 102 may then leave the merchant's store with the purchased items and may receive an instant receipt and a balance update on his or her mobile device.

FIG. 2A also includes a step 11, which occurs when there is a transaction in a closed-loop system. In a closed loop system, all consumers or customers in the system have accounts with a single payment services provider (which may be a bank) or with a small number of cooperating payment services providers. In these closed-loop systems, purchase or payment transactions involve direct transfers between customers' accounts that are issued by the payment services provider.

Figure 2B:
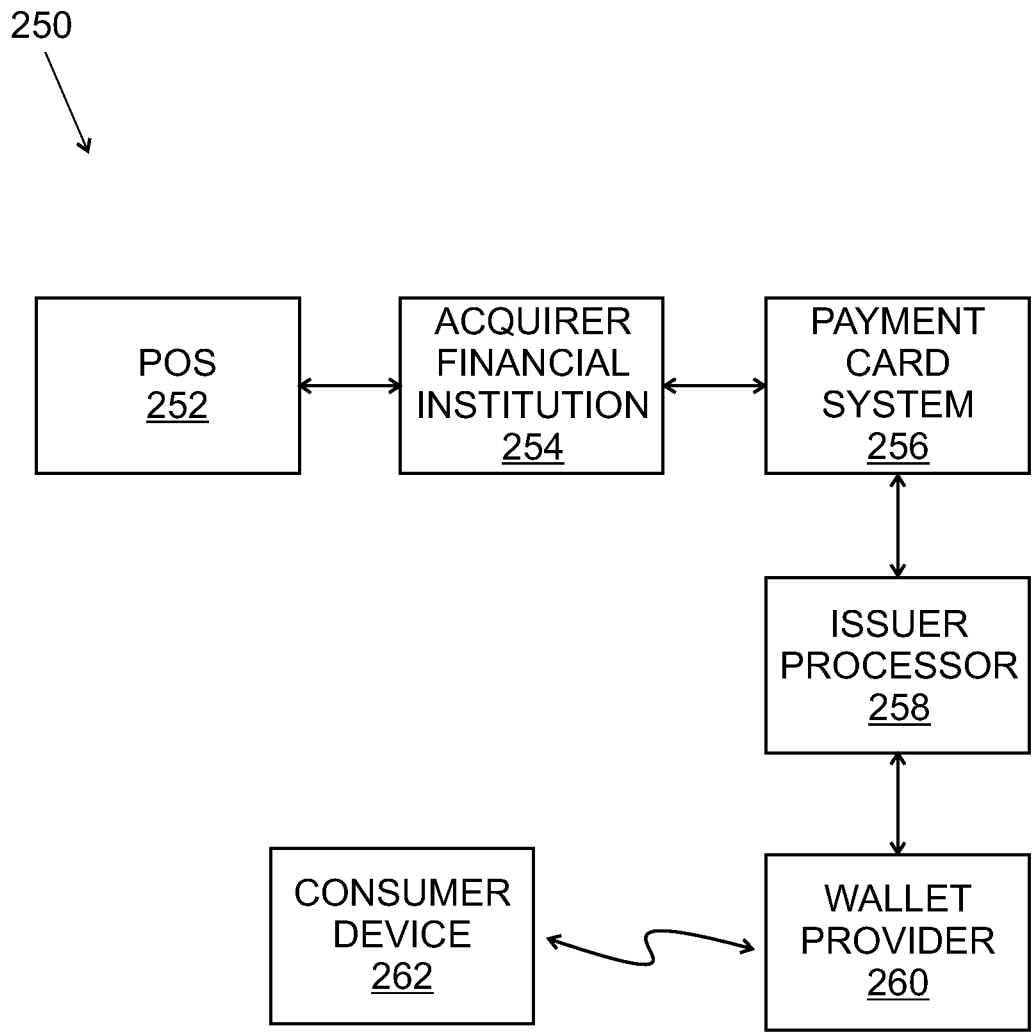
FIG. 2B is a block diagram of a mobile companion card transaction system according to an embodiment of the disclosure.

FIG. 2B is a block diagram of a mobile companion transaction system 250 according to an embodiment. The system 250 includes a POS terminal 252 operable to transmit information to an Acquirer Financial Institution (FI) issuer processor computer system 254 which communicates with a Payment Card System 256 server computer. The Payment Card System server computer is configured to identify and then communicate with an Issuer processor 258. It should be understood that each block in FIG. 2B may represent multiple processors and/or computer systems associated with one or more entities. For example, the Issuer processor 258 may represent computer systems of multiple and/or different third party entities, such as Issuer Service Providers associated with and performing on behalf of services for a plurality of Issuer FIs. Also, in some embodiments, the components of the system 250 are configured to operate as discussed above with regard to FIG. 2A.

Figure 3:
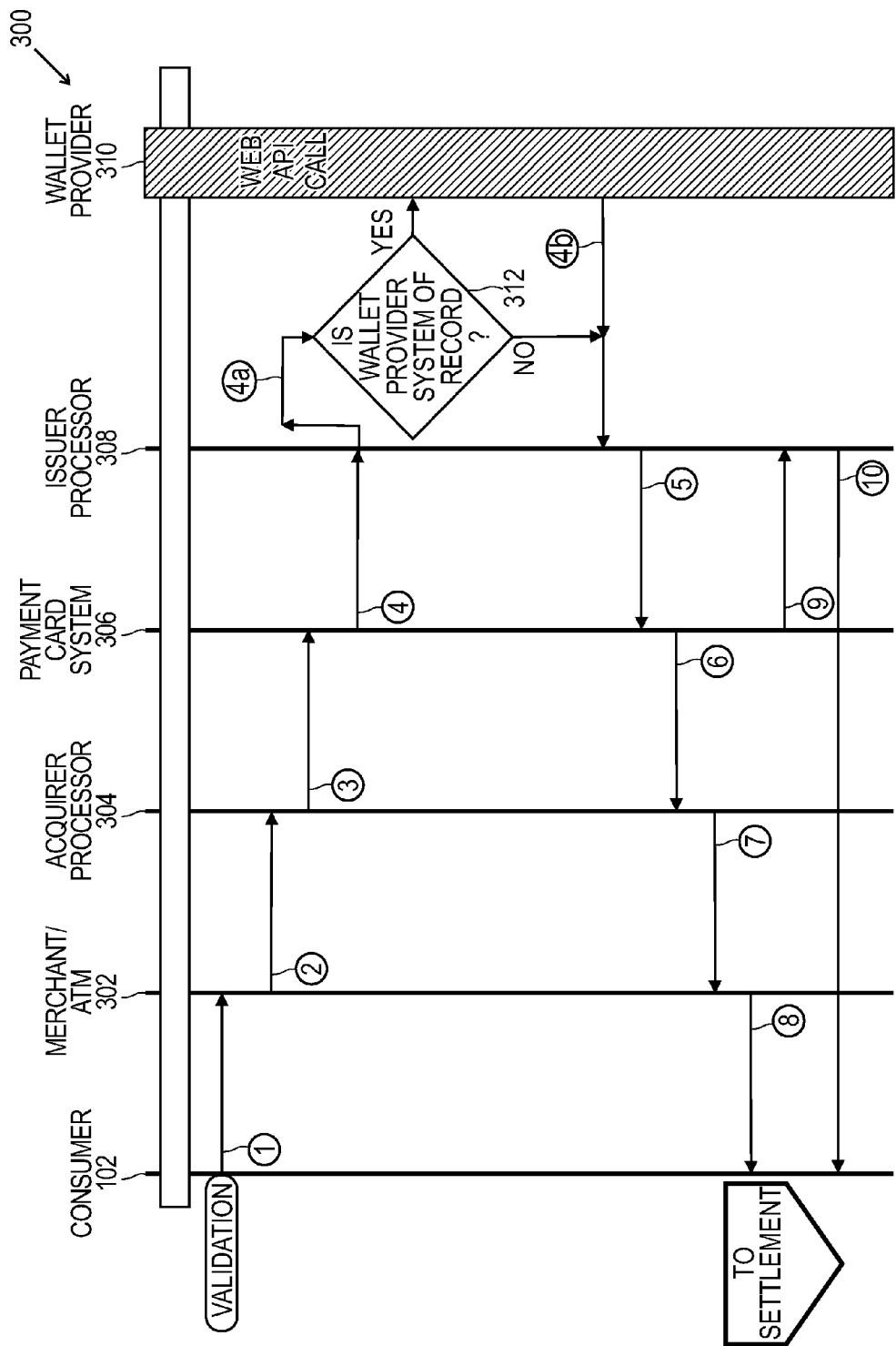
FIG. 3 is a flow diagram illustrating PIN-based debit processes for a consumer or cardholder to receive cash from a merchant and/or an ATM by using his or her mobile companion prepaid card in accordance with the disclosure.

FIG. 3 is a flow diagram illustrating CVM-based debit processes 300 in accordance with embodiments for a consumer or cardholder 102 to receive cash from an agent and/or an ATM 302 by using his or her mobile companion prepaid card. In step 1, the cardholder 102 presents his or her mobile companion prepaid card to the Merchant/ATM 302 in a "single message to single message" format for a debit transaction. In this format, the customer must perform a CVM, such as entering a PIN and/or a biometric identifier, during the process. In another variant, the customer must provide a signature. Thus, in this example, a card reader associated with a POS terminal or a reader device associated with an ATM at a bank, for example, in step 2 collects cardholder payment data (which may include the PIN and/or a biometric identifier, such as a thumbprint) and transmits that information to an Acquirer Processor 304. The Acquirer Processor in step 3 transmits a payment card system-branded message to the payment card system 306 (which may be, for example, the well-known Banknet® system operated by the assignee hereof). The payment card system then determines in step 4 which issuer financial institution (FI) or issuer bank to contact, and whether that issuer bank supports the brand that has been presented. Next, in step 4A, the Issuer Processor 308 performs card account validation processing, and if it fails, then the transaction is declined. However, if validation processing is successful, then the Issuer processor checks 312 to see if the wallet provider 310 is the system of record. If so, then the Issuer processor 308 forwards the authorization to the Wallet Provider 310 via an API Web request. The Wallet Provider 310 then verifies the availability of funds and in step 4B sends an authorization message back to the Issuer processor 308. The Issuer Processor 308 then verifies he availability of funds and (verifies that funds are available) and transmits in step 5 a financial response to the Payment Card System 306, which forwards the financial response in step 6 to the Acquirer Processor 304, which in turn in step 7 forwards it to the Merchant/ATM 302, which in some embodiments then dispenses cash and a receipt to the Cardholder 102. In some embodiments, when there is a successful debit transaction, the agent provides a record of the transaction for settlement purposes.

Referring again to FIG. 3, in some embodiments, in step 1 the Cardholder 102 presents his or her mobile companion prepaid card to the Merchant 302 in a "single to dual message" format. In this case, the process continues in step 2 as described above, but in step 3 a financial transaction message is sent from the Acquirer Processor 304 to the Payment Card System 306 that is in a financial transaction message format including authorization and clearing requirements. Thus, in step 4, after the Payment Card System 306 determines the appropriate issuer bank and that that issuer supports the brand, the transaction is processed (in steps 4A and 4B) and the financial request is converted to an authorization request message and handled by the Issuer processor 308 and Wallet Provider 310 as described above. After the Wallet Provider 310 verifies that funds are available, then the Issuer processor 308 in step 5 transmits an authorization response to the Payment Card System 306. In this case, the Payment Card System 306 converts the authorization response to a financial response indicating that the debit transaction is authorized to the Issuer Processor 308, and then transmits it in step 6 to the Acquirer Processor 304 which, in step 7, forwards it to the Merchant/ATM 302. In some implementations, the Merchant and/or ATM then dispenses cash and a receipt to the Cardholder 102.

In the "single to dual message" format, steps 9 and 10 are included because the authorization response does not contain all the financial data needed to post a transaction to the cardholder's account. Accordingly, the Issuer Processor 308 must hold the funds against the cardholder's account until it receives a presentment message from the Merchant and/or ATM 302, which typically occurs at the end of a predetermined period (such at the end of the day). Thus, at the end of the predetermined period, in step 9 the Payment Card System 306 populates the Acquirer Processor's financial transaction request, and then in step 10 the Issuer Processor receives the presentment and posts the debit transaction to the Cardholder's account.

Figure 4:
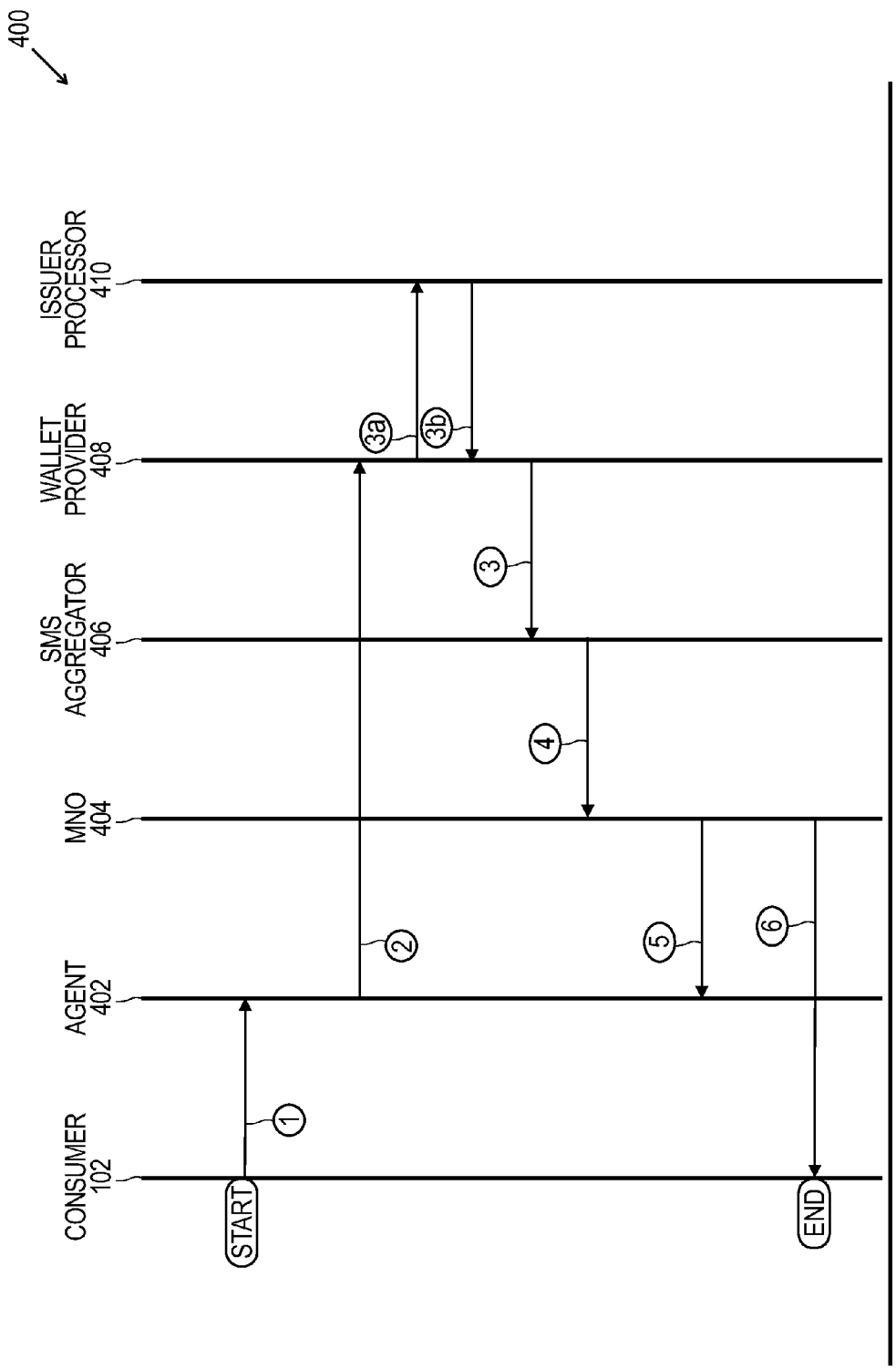
FIG. 4 is a flow diagram illustrating a mobile companion prepaid card account load process at an Agent according to an embodiment of the disclosure.

FIG. 4 is a flow diagram illustrating a mobile companion prepaid card account load process 400 by a Cardholder or Consumer 102 at an Agent 402 according to an embodiment. In step 1, the Cardholder requests an account load at an Agent location (for example, an agent at a physical location) and provides cash to the Agent. In step 2, the Agent 402 accepts the cash and forwards a request to the Wallet Provider 408 on behalf of the Cardholder that includes the Cardholder's MSISDN and an Agent mobile personal identification number (mPIN). If the Wallet Provider 408 is the wallet provider system of record for that consumer's companion prepaid card, then the Wallet provider validates the request, increments funds in the Cardholder's mobile wallet account, and initiates an SMS notification in step 3 to an SMS Aggregator 406. Next, in step 4, the SMS Aggregator 406 receives the SMS notification request, looks-up the MSISDN of the Cardholder, identifies the corresponding MNO, applies that MNO's message rules and transmits the request for the SMS notification to the MNO 404. Next, in step 5, the MNO 404 sends the SMS response to the Agent and also in step 6 sends the SMS response to the Cardholder's mobile device.

Referring again to FIG. 4, after receiving the request from the Agent in step 2, if the Wallet Provider 408 determines that it is not the wallet system provider of record, then the Wallet Provider 408 in step 3a transmits the request to the Issuer processor 410 for processing. The Issuer processor 410 then increments funds in the stored value account (SVA) and notifies the Wallet Provider in step 408. Processing then continues with steps 3 to 6 as described above to load the companion prepaid card.

Figure 5:
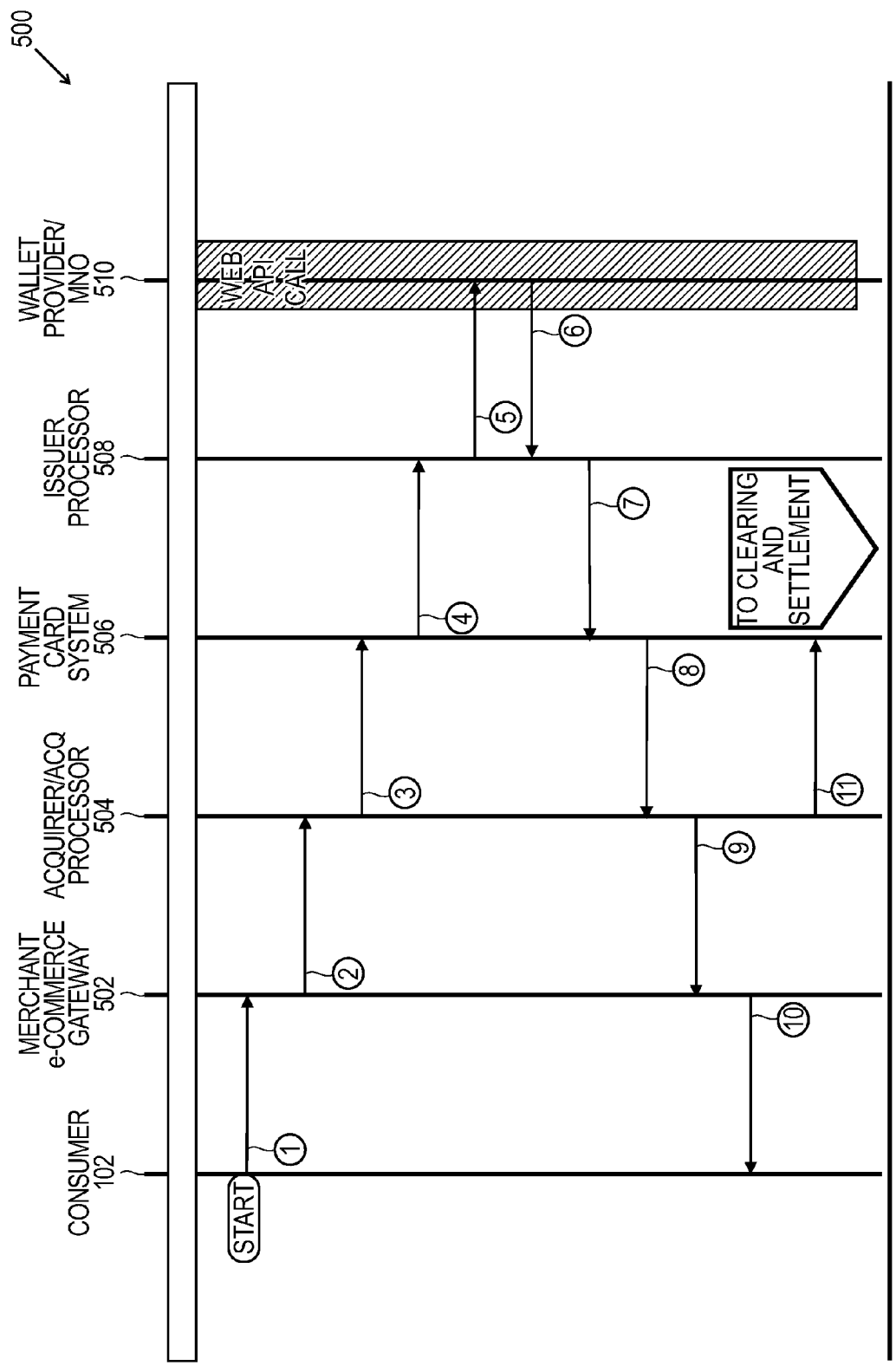
FIG. 5 is a flow diagram illustrating a mobile companion prepaid card E-Commerce transaction process according to an embodiment of the disclosure.

FIG. 5 is a flow diagram illustrating a mobile companion prepaid card E-Commerce process 500 according to some embodiments. In some implementations, in step 1 the Consumer or mobile companion prepaid cardholder 102 uses an internet connected device to shop for goods and/or services on the internet. Once a shopping cart is populated with items and the consumer is finished shopping, the cardholder 102 checks-out by inputting his or her mobile companion prepaid card account details on the internet websites' checkout page, and that information is transmitted to a Merchant e-Commerce Gateway 502. The Merchant e-Commerce Gateway initiates a request in step 2 to an Acquirer and/or Acquirer Processor 504, which in step 3 transmits an authorization request to a Payment Card System 506. In step 4, the Payment Card System 506 forwards the authorization request with PAN (typically a 16-digit payment card account number) to an Issuer Processor 508. Next, in step 5 the Issuer Processor removes all PCI protected payment data and forwards the authorization request to the Wallet Provider and/or MNO 510, which authorizes the transaction and debits "Open to Buy", which means that funds are debited from the available amount in that pre-paid account. In addition, in step 6 the Wallet Provider 510 authorizes funds on the account and sends the authorization response to the Issuer Processor 508 which transmits the response in step 7 to the Payment Card System 506. The Payment Card System in step 8 forwards the response to the Acquirer Processor 504 which forwards the response in step 9 to the Merchant e-Commerce Gateway 502. The Merchant e-Commerce Gateway 502 then provides a confirmation e-mail and/or an SMS message in step 10 to the cardholder 102. In addition, in step 11, the Acquirer Processor 504 submits the authorization response to the Payment Card System 506 for clearing and/or settlement purposes.

Figure 6:
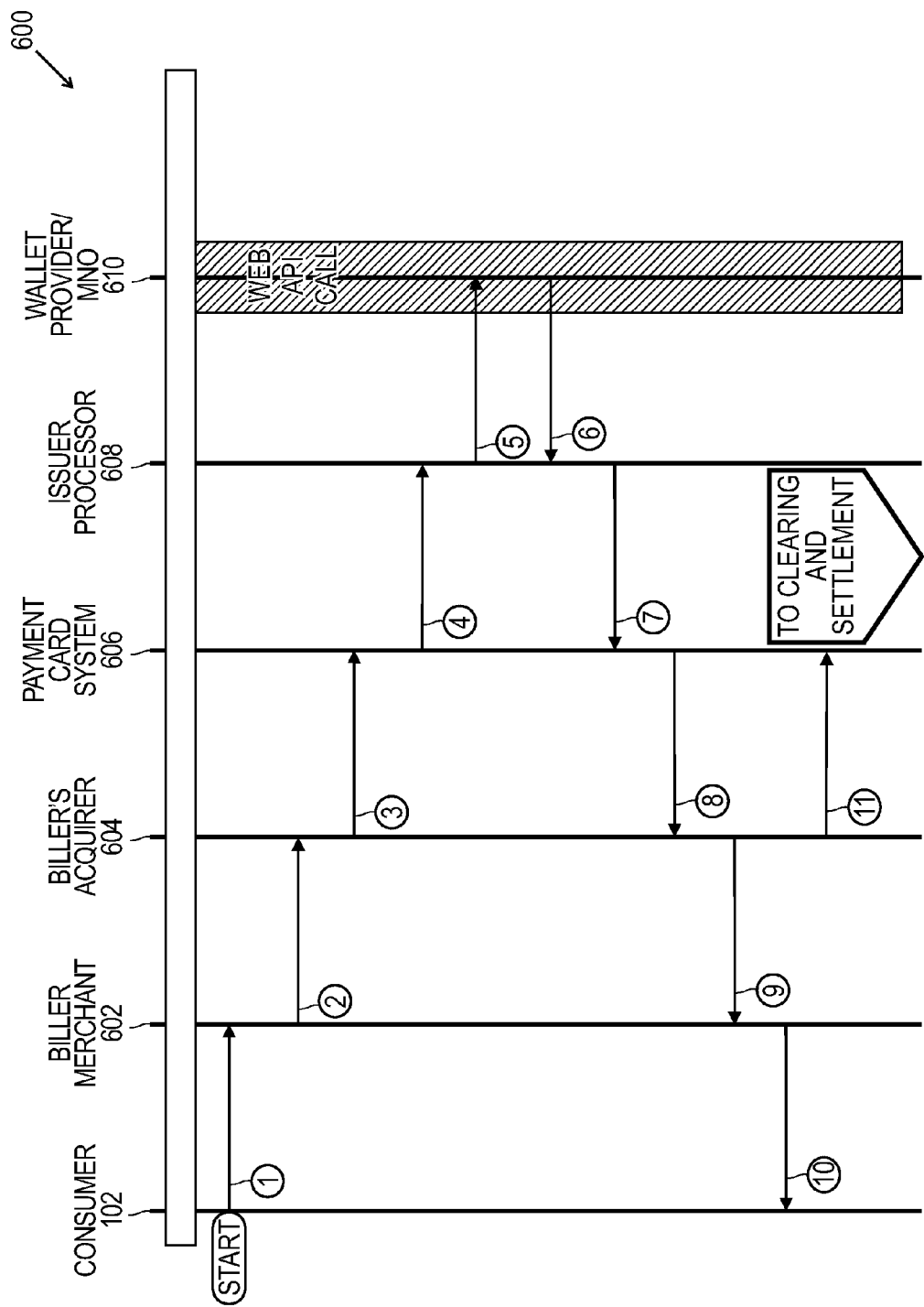
FIG. 6 is a flow diagram illustrating a mobile companion prepaid card bill payment transaction process according to an embodiment of the disclosure.

FIG. 6 is a flow diagram illustrating a mobile companion prepaid card bill payment process 600 according to an embodiment. In some embodiments, in step 1 the consumer or mobile companion prepaid Cardholder 102 requests making a bill payment by swiping the mobile companion prepaid card at a POS terminal of a Biller Merchant 602. The Biller Merchant 602 then initiates a request in step 2 to the Biller Acquirer 604, which in step 3 transmits an authorization request message to a Payment Card System 606. In step 4, the Payment Card System 606 forwards the authorization request with PAN (typically a 16-digit payment card account number) to an Issuer Processor 608. Next, in step 5 the Issuer Processor strips all PCI protected payment data and forwards the authorization request to the Wallet Provider and/or MNO 610, which authorizes the transaction and debits funds from the available amount in that pre-paid mobile companion card account (which may be an SVA account). In addition, in step 6 the Wallet Provider 610 authorizes funds on the account and sends the authorization response to the Issuer Processor 608 which transmits the response in step 7 to the Payment Card System 606. The Payment Card System in step 8 forwards the response to the Acquirer Processor 604 which forwards the response in step 9 to the Biller Merchant 602. The Biller Merchant 602 then provides a confirmation e-mail and/or an SMS message in step 10 to the cardholder 102 for display on the cardholder's mobile device. In addition, in step 11, the Biller's Acquirer 604 submits the authorization response to the Payment Card System 606 for clearing and/or settlement purposes.

Figure 7:
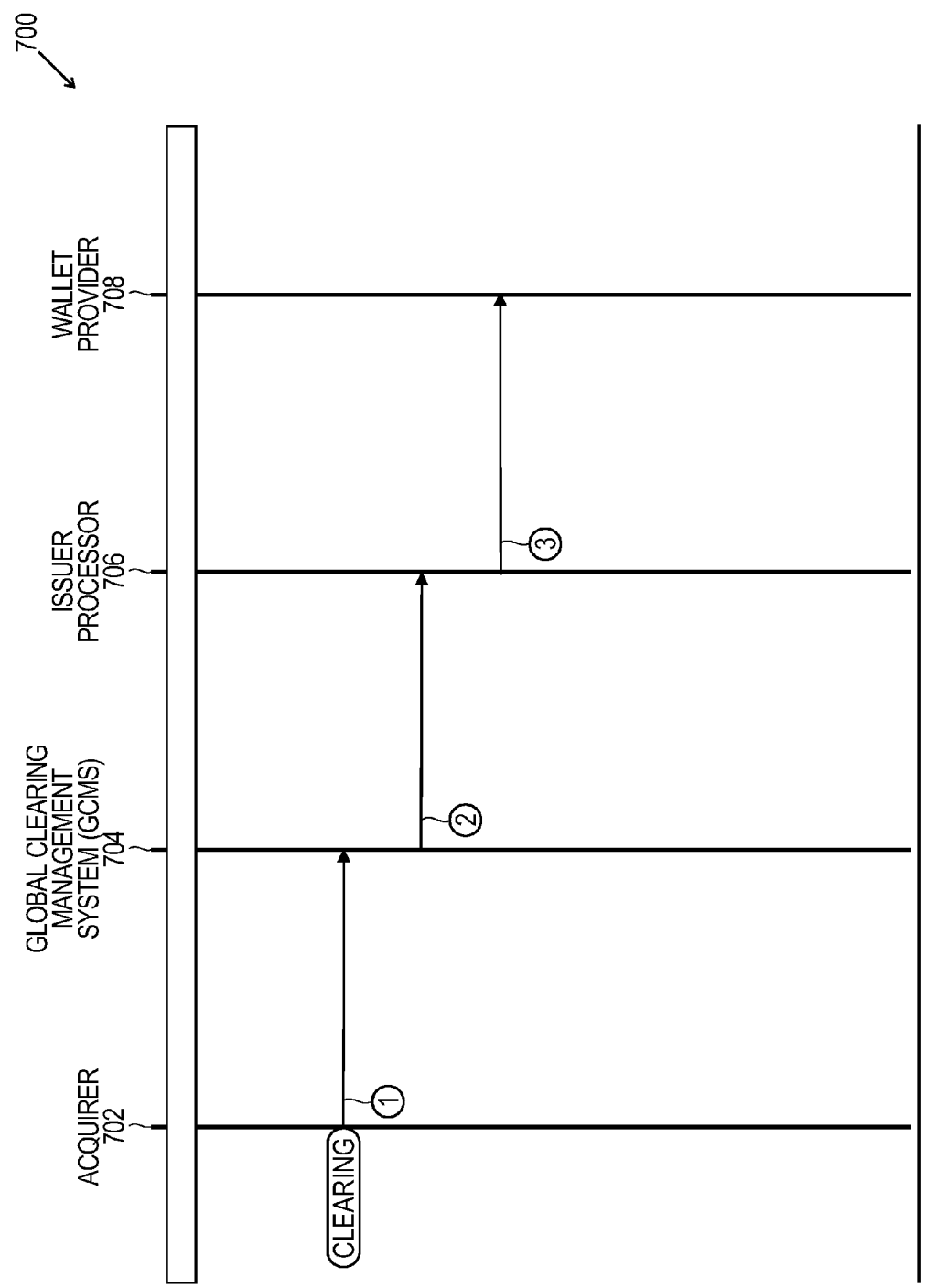
FIG. 7 illustrates a mobile companion prepaid card clearing process according to an embodiment of the disclosure.

FIG. 7 illustrates a mobile companion prepaid card clearing process 700 according to an embodiment. In some implementations, at the end of the day a merchant batches all of the transactions that have occurred and transmits that data to the Acquirer bank 702 for clearing processing. In step 1, the Acquirer 702 creates a clearing file in accordance with rules promulgated by a payment card system, and transmits a "first presentment" clearing file to a Global Clearing Management System (GCMS) 704 for processing. The GCMS 704 validates the data, approves or rejects the message, creates clearing files and then in step 2 transmits the clearing files to an Issuer Processor 706 of an issuing bank. The Issuer Processor 706 processes the clearing file to identify transactions and matches them to authorizations. The Issuer Processor may also include any adjustments that may be required for a particular transaction, for example, to take tips into account, and reconciles the transaction amount with the settlement advice from the payment card system. Next, in step 3, the Issuer Processor transmits a reconciliation report to the Wallet Provider 708 advising settlement amounts and any exception handling (such as for tips and the like).

Figure 8:
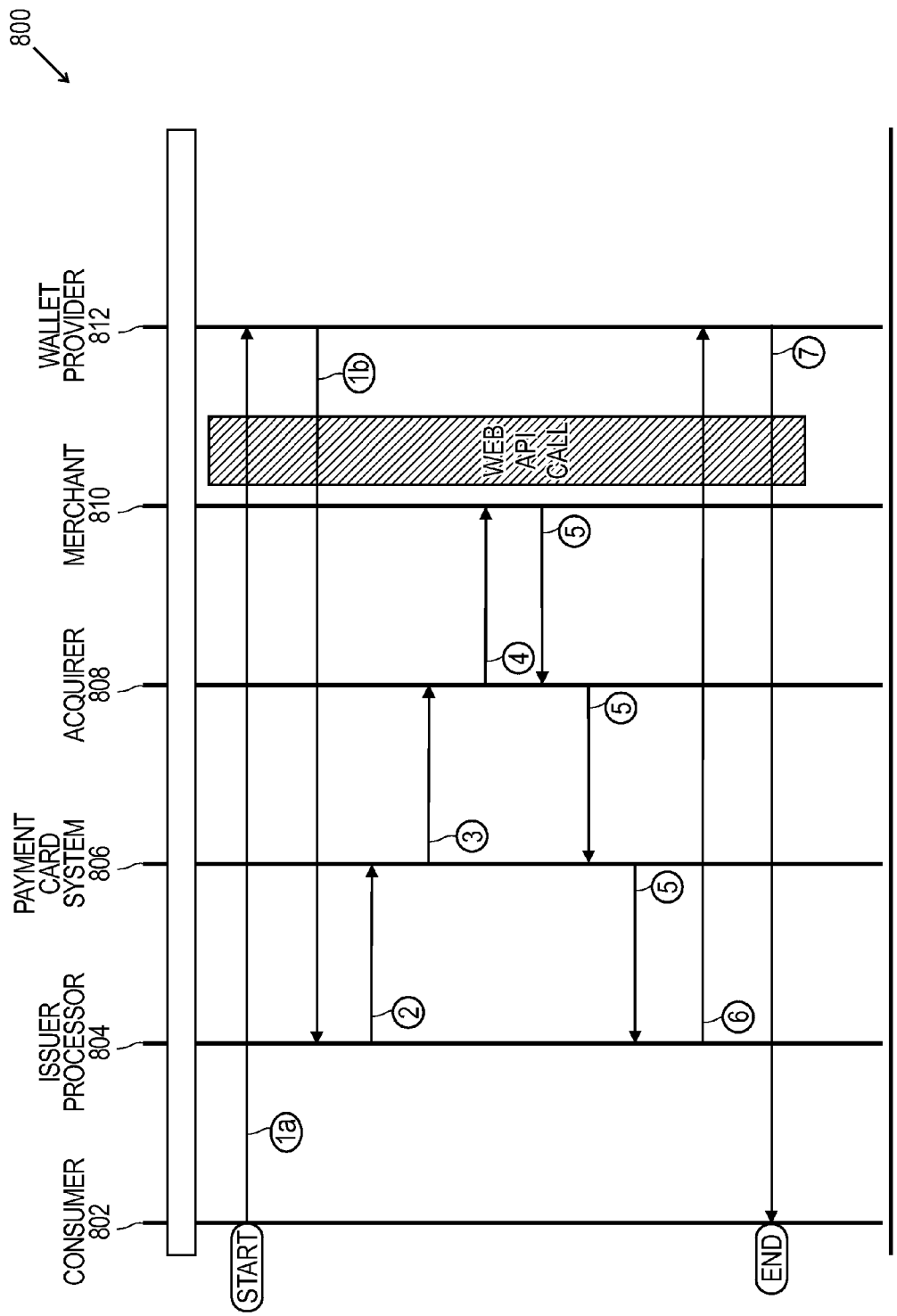
FIG. 8 illustrates a mobile companion prepaid card cardholder dispute process according to an embodiment of the disclosure.

FIG. 8 illustrates a mobile companion prepaid card cardholder dispute process 800 according to an embodiment. The process may be initiated by a consumer or cardholder 802 when he or she does not recognize a transaction that has been posted to his or her mobile companion prepaid card account. In particular, in step 1a the cardholder 102 submits a dispute claim directly to the Wallet Provider 812, which in step 1b initiates a dispute via a WEB API with the Issuer Processor 804. In step 2, the Issuer Processor 804 submits a first chargeback request to the payment card system 806 within a predetermined period of time from the first presentment date. In step 3, the payment card system 806 routes the chargeback request to the corresponding Acquirer 808 and debits the Acquirer. In step 4, the Acquirer 808 then requests documentary evidence from the Merchant 810, and in step 5 the merchant transmits the documentary evidence (such as a copy of the sales receipt) to the Acquirer 808, which is propagated through the payment card system 806 as shown to the Issuer Processor 804. In step 6, the Issuer Processor 804 transmits the documentary evidence to the Wallet Provider 812, which in step 7 transmits it to the Consumer or Cardholder 102 for review and consideration. If the Consumer 102 agrees with the documentary evidence, then the process ends as there is no longer a dispute. However, if the Cardholder 102 does not agree with the documentary evidence provided by the Wallet Provider 812 then the Wallet Provider 812 in conjunction with the Issuer 804 and Acquirer 808 must make a decision regarding how the charge for that transaction should be handled based on their respective individual risk criteria. Other considerations may also factor into the equation of how to treat a particular charge that is disputed by a Cardholder, which is beyond the scope of the present disclosure.

Figure 9:
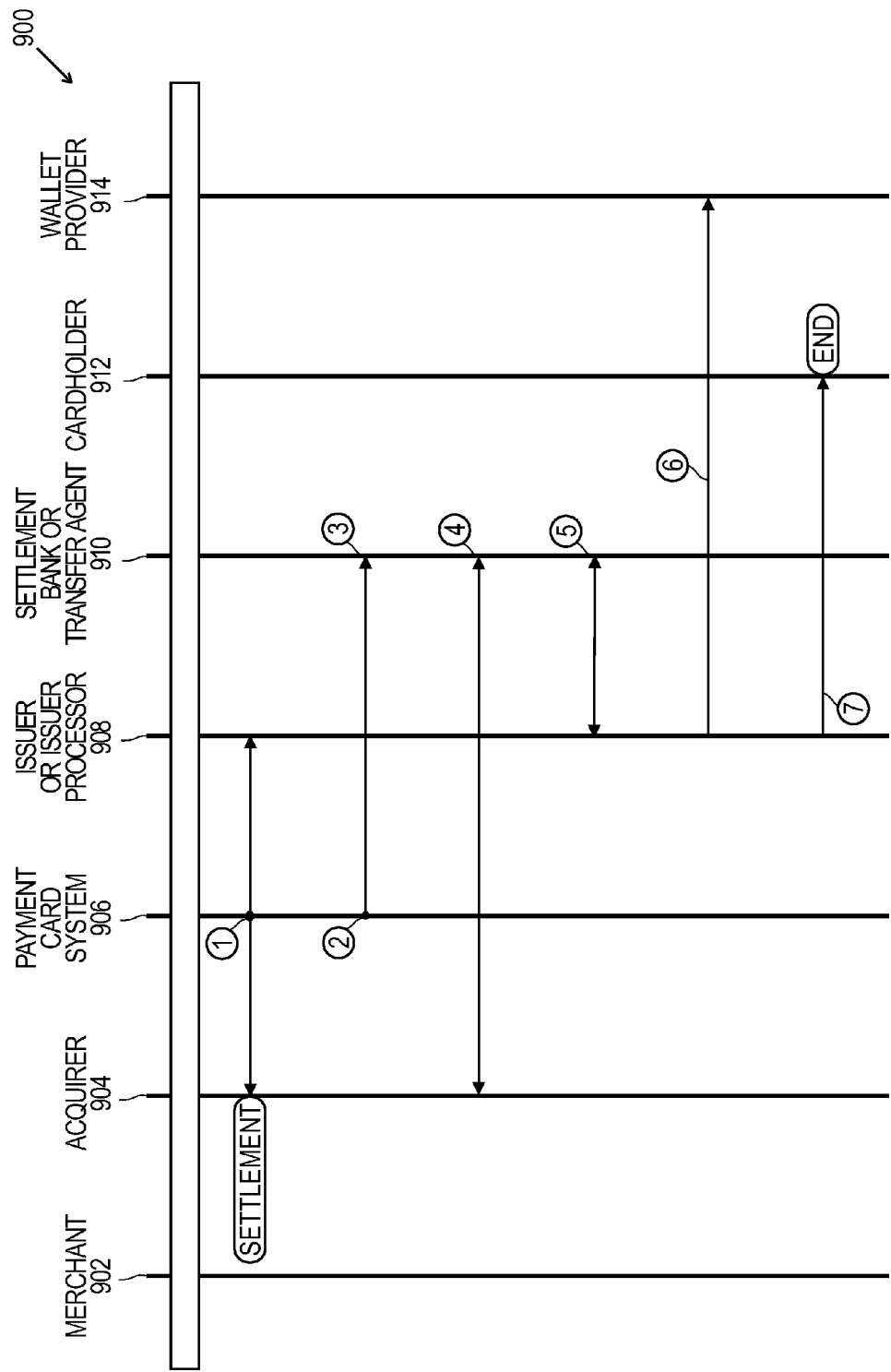
FIG. 9 illustrates a mobile companion prepaid card settlement process according to an embodiment of the disclosure.

FIG. 9 illustrates a mobile companion prepaid card settlement process 900 according to an embodiment, which process is an exchange of funds on behalf of members who have sent or received financial transactions through the clearing process. Before conducting the process, members (issuers and acquirers) complete a net settlement information form that establishes their customer parameters. In addition, it should be noted that members can reconcile transactions sent to and received from clearing by comparing the clearing messages to the settlement advisement messages. In some embodiments, as shown about with regard to previous figures, all communications with the Wallet Provider are via a web API and may be governed by a bi-lateral agreement between the Wallet Provider and the entity it is communicating with.

Referring to FIG. 9, a payment card system 906 includes a Global Clearing Management System (GCMS) component and a Settlement Account Management (SAM) system component (not shown). In step 1, the GCMS sorts all transactions from Issuers 908 and Acquirers 904 and calculates a net settlement position for each member. The GCMS then transmits a net settlement file to the SAM system and a settlement message to the member banks (Acquirers 904 and Issuers 908) for settlement. In step 2, the SAM system component provides settlement instructions (advisement) to the Settlement Bank or Transfer Agent 910 (which may be via MOL, Facsimile, E-Mail, or SWIFT) including a value-date that indicates the date funds are required to be moved. In step 3, the Settlement Bank 910 receives the settlement instructions from the SAM system and then conducts a settlement process with the Acquirer and Issuer banks. In particular, in step 4, the Settlement bank 910 settles with the Acquirer financial institution (FI) 904 and in step 5 the Settlement bank 910 settles with the Issuer FI 908. It should be noted that members (Acquirer FIs and Issuer FIs) who do not honor settlement advisements (i.e., fail to remit) receive an assessment from the payment card system 906. In addition, cut-off limits may vary by region. Next, in step 6, the Issuing bank or processor 908 transmits an advisement to the Wallet Provider 914 via a WEB API (which may be a settlement abstract) for storage therein, and in step 7 the Issuer 908 sends a statement to the Cardholder 912.

Figure 10:
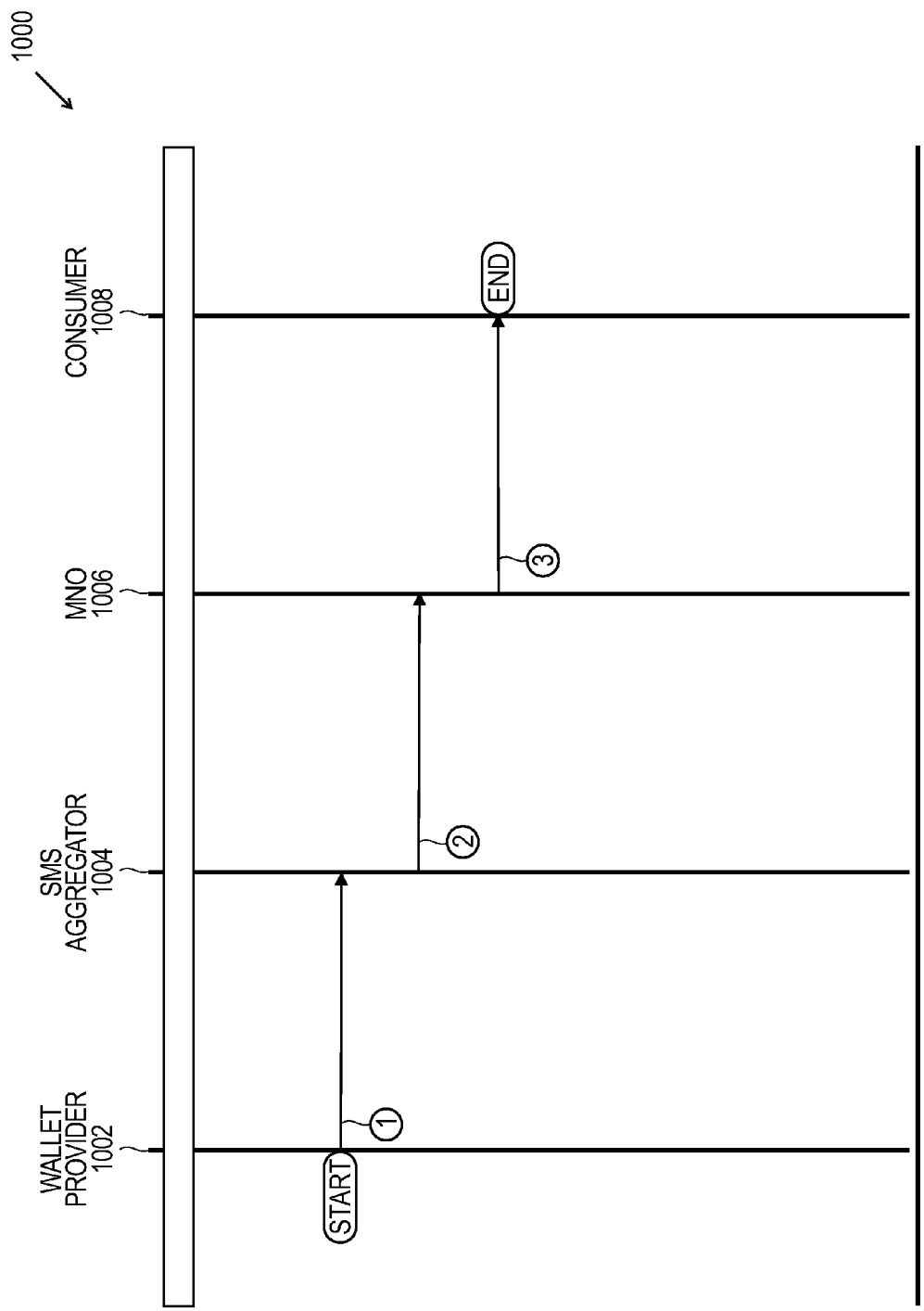
FIG. 10 illustrates a mobile companion prepaid card mobile-centric SMS confirmation process according to an embodiment of the disclosure.

FIG. 10 illustrates a mobile companion prepaid card mobile-centric SMS confirmation process 1000, which occurs for each transaction according to an embodiment. In step 1, upon receipt of a successful transaction authorization from an Issuer FI processor, the Wallet Provider 1002 initiates a transaction confirmation and transmits it to an SMS Aggregator 1004. In some embodiments, the transaction confirmation includes the date and time of the transaction, the transaction amount, merchant information, cardholder name and address, an approval identifier, and a mobile number (MSISDN) for the SMS aggregator. In step 2, the SMS Aggregator 1004 receives the confirmation information, looks-up the MSISDN and identifies the MNO 1006 of the consumer, applies MNO message rules and forwards the confirmation information to the MNO 1006. Next, in step 3 the MNO 1006 forwards the confirmation message over the mobile network to the Cardholder 1008 (and mobile subscriber) for display on his or her mobile device.

Figure 11:
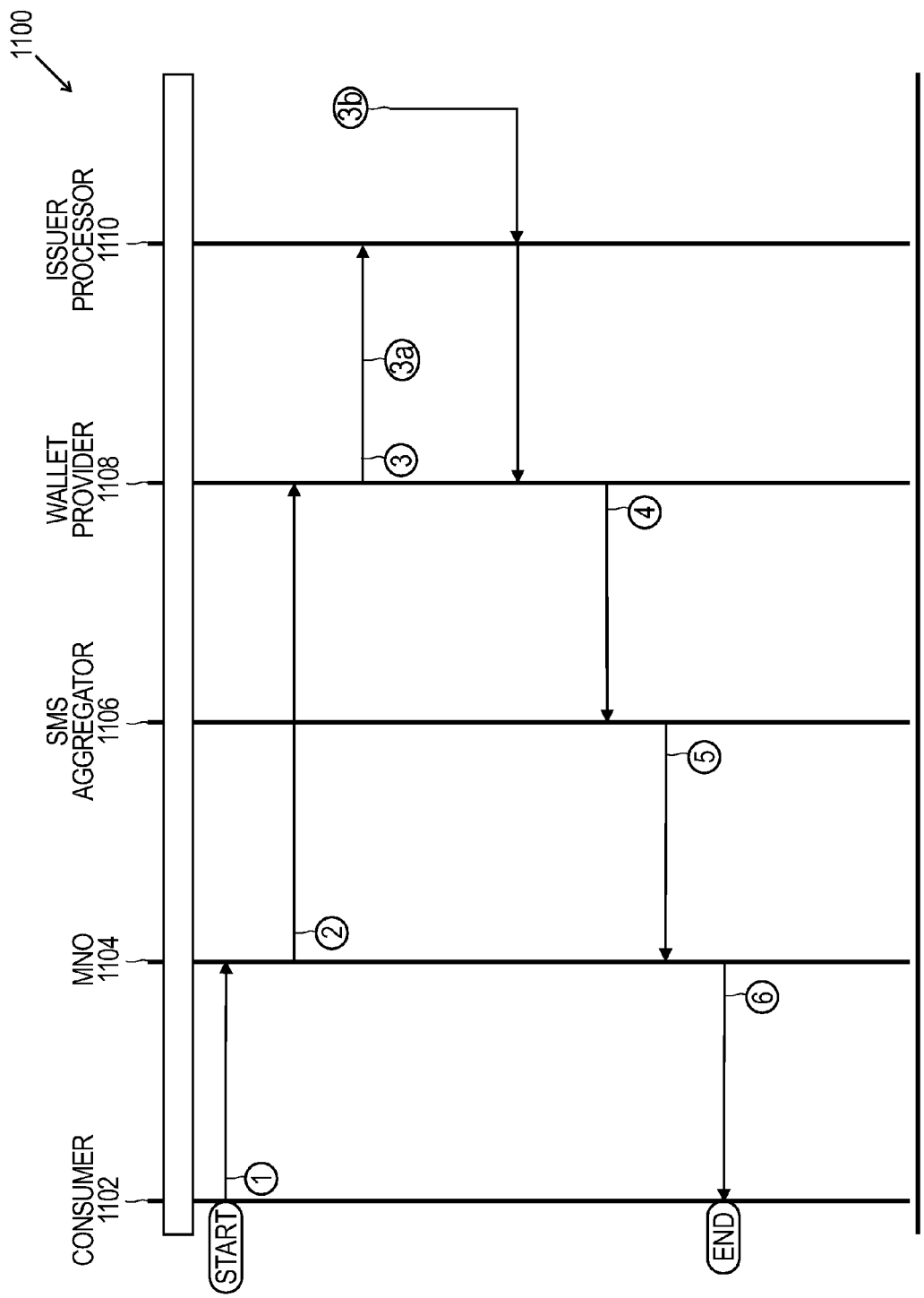
FIG. 11 illustrates a mobile companion prepaid card mobile-initiated Lock and/or Unlock process according to an embodiment of the disclosure.

FIG. 11 illustrates a mobile companion prepaid card mobile-initiated Lock and/or Unlock process 1100 according to an embodiment. In particular, a Cardholder 1102 may desire to selectively lock and/or unlock his mobile companion prepaid card account on-demand (the consumer may wish to lock the mobile companion prepaid card account to control spending, for example, if his or her mobile device and/or mobile companion prepaid card are in the hands of another family member, or if the card has been misplaced and/or has likely been lost or stolen). Thus, for example, in step 1 the Cardholder 1102 submits an SMS lock request, which in some embodiments includes an mPIN (and/or other CVM data) and MSISDN, concerning his or her mobile companion prepaid card account to the MNO 1104. In step 2, the MNO verifies the mPIN (and/or other CVM data) and then forwards the SMS lock request to the Wallet Provider 1108. In step 3*a*, the Wallet Provider 1108 initiates an API request to lock the mobile companion prepaid card account and transmits it to the Issuer Processor 1110, which in step 3*b* locks the mobile prepaid card account and generates a response that is transmitted back to the Wallet Provider 1108 stating that the card is now in a locked condition. In step 4, the Wallet Provider 1108 transmits an SMS response to the SMS Aggregator 1106. In step 5, the SMS Aggregator performs a MSISDN look-up, identifies the corresponding MNO, applies the MNO message rules and forwards an SMS response to the consumer's lock request to the appropriate MNO 1104. In step 6, the MNO 1104 forwards the confirmation message to the Cardholder 1102, which indicates and/or confirms that the mobile companion prepaid card account is now locked in accordance with the consumer's request. In some embodiments, the confirmation message is configured for display on the consumer's mobile device. The process described above can also be followed to unlock a previously locked mobile companion prepaid card account so that it can again be used to make purchase transactions.

Figure 12:
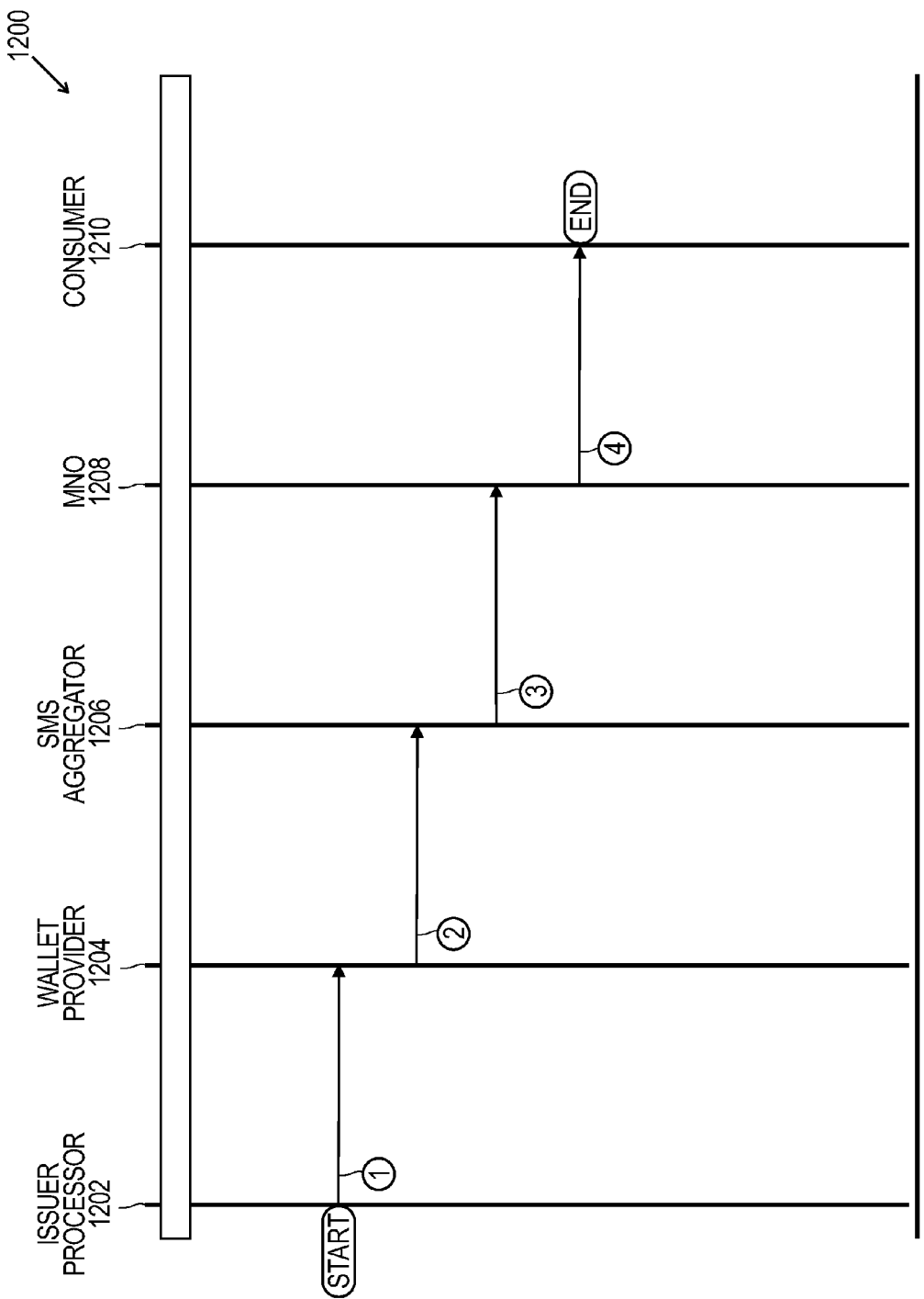
FIG. 12 illustrates a mobile companion prepaid card expiration SMS alert process according to an embodiment of the disclosure.

FIG. 12 illustrates a mobile companion prepaid card mobile-centric SMS alert (before the card expires) process 1200 according to an embodiment. In an embodiment, two months (or some other pre-determined time frame) before a particular consumer's mobile companion prepaid card is scheduled to expire, an Issuer Processor 1202 initiates in step 1*a* notification message for transmission. In some implementations, the notification message includes the date and time of generation of the notification message, a transaction identifier and the last 4-digits of the PAN of the mobile companion prepaid card account. The Issuer Processor 1202 then transmits the notification to the Wallet Provider 1204. In step 2, the Wallet Provider then initiates SMS instructions to allow the Cardholder to renew his or her mobile companion prepaid card. For example, the SMS instructions may include activation instructions and a help number, and the Wallet Provider then transmits an SMS request to the SMS Aggregator 1206. In step 3, the SMS Aggregator 1206 receives the request, looks-up the Cardholder via an MSISDN or other identifier, identifies the appropriate or corresponding MNO, applies MNO message rules, and forwards the SMS request to the MNO 1208. In step 4, the MNO 1208 forwards the SMS message over the mobile network to the Cardholder's mobile device for display. In some embodiments, if the Cardholder wishes to renew his or her mobile companion prepaid card, he or she can go to an agent location (such as a bank or a merchant location) to receive a replacement card and follow the activation procedure included in the SMS message.

Figure 13:
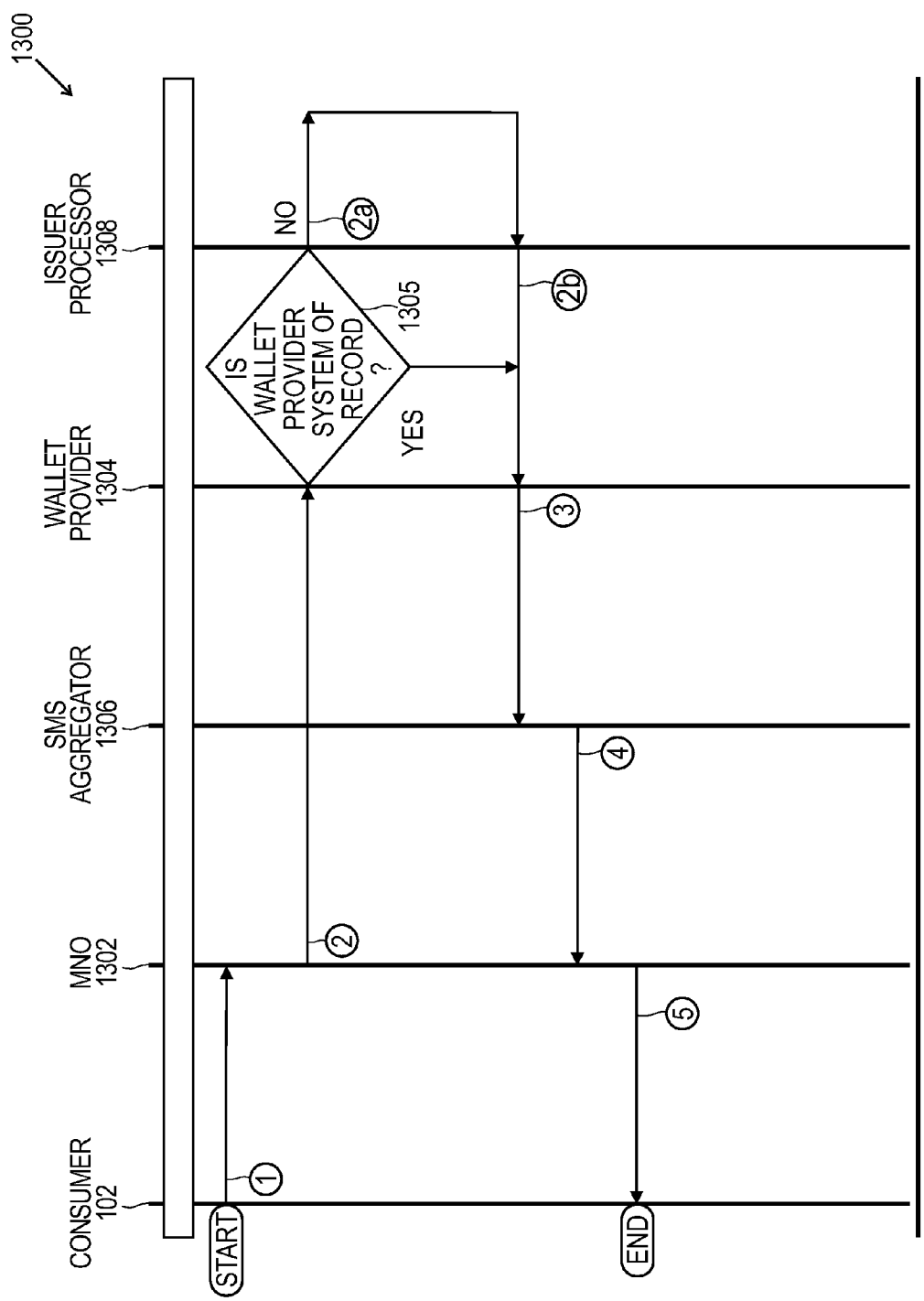
FIG. 13 is a flow diagram illustrating a mobile companion prepaid card transaction history process according to an embodiment of the disclosure.

FIG. 13 is a flow diagram illustrating a mobile companion prepaid card transaction history process 1300 according to an embodiment. In some embodiments, the consumer or mobile companion prepaid Cardholder 102 wishes to view information concerning the previous "X" number of transactions conducted by his or her mobile telephone. In some embodiments, the Cardholder selects a "mobile transaction history" option from a menu of possible actions (or the Cardholder sends an SMS message to a previously defined short code) which request includes a limited number of previous transactions (which may be a predetermined number, such as five transactions) and then enters a cardholder identifier, such as a mobile personal identification number (mPIN). In step 1 of FIG. 13, the consumer or Cardholder 102 transmits an SMS message to a mobile network operator (MNO) 1302, which in step 2 verifies the cardholder identifier (such as the mPIN) and forwards the message to the wallet provider 1304. The wallet provider 1304 then determines 1305 if it is the system of record, and if so, then in step 3 the wallet provider looks up the consumer's mobile device transaction history, for example, in a mobile telephone transactions database. Once the consumer's mobile transaction history is located, then in step 3 the wallet provider 1304 generates a mobile telephone transaction history response which includes the details for the last "X" transactions and transmits it in step 3 to an SMS aggregator 1306. The details for each transaction may include, for example, the transaction date and time, the transaction amount, merchant information such as merchant name and address, an approval identifier, and a mobile number (MSISDN) for the SMS aggregator. The SMS aggregator 1306 then utilizes the mobile number to look up the cardholder's mobile network operator (MNO) 1302 and applies that MNO's mobile message rules and in step 4 forwards the transaction history response to the cardholder's MNO 1302. In step 5, the MNO 1302 then forwards the mobile transaction history message to the Cardholder 102 for display on a display component of the Cardholder's mobile telephone.

However, if the wallet provider 1304 determines 1305 that it is not the system of record, then in step 2A the wallet provider 1304 forwards the mobile telephone transaction history request to the issuer processor 1308. In some embodiments, the issuer processor 1308 performs a database lookup, finds the cardholder transaction data, and then generates a mobile transaction history response that includes details for each of the last "X" mobile telephone transactions. As mentioned above, the details for each mobile telephone transaction may include, but are not limited to, the transaction date and time, the transaction amount, merchant information such as merchant name and address, an approval identifier, and a mobile number (MSISDN). The issuer processor 1308 then transmits the mobile device transaction history response in step 2B to the wallet provider 1304, which in step 3 forwards the mobile device transaction history response to an SMS aggregator 1306. As mentioned above, the SMS aggregator 1306 then utilizes the mobile number to look up the cardholder's mobile network operator (MNO) 1302 and then applies that MNO's mobile message rules. Thus, in step 4 the SMS Aggregator 1306 forwards the mobile device transaction history response to the cardholder's MNO 1302. In step 5, the MNO 1302 then transmits the mobile transaction history response message to the Consumer 102 for display on a display component of the consumer's mobile telephone.

Figure 14:
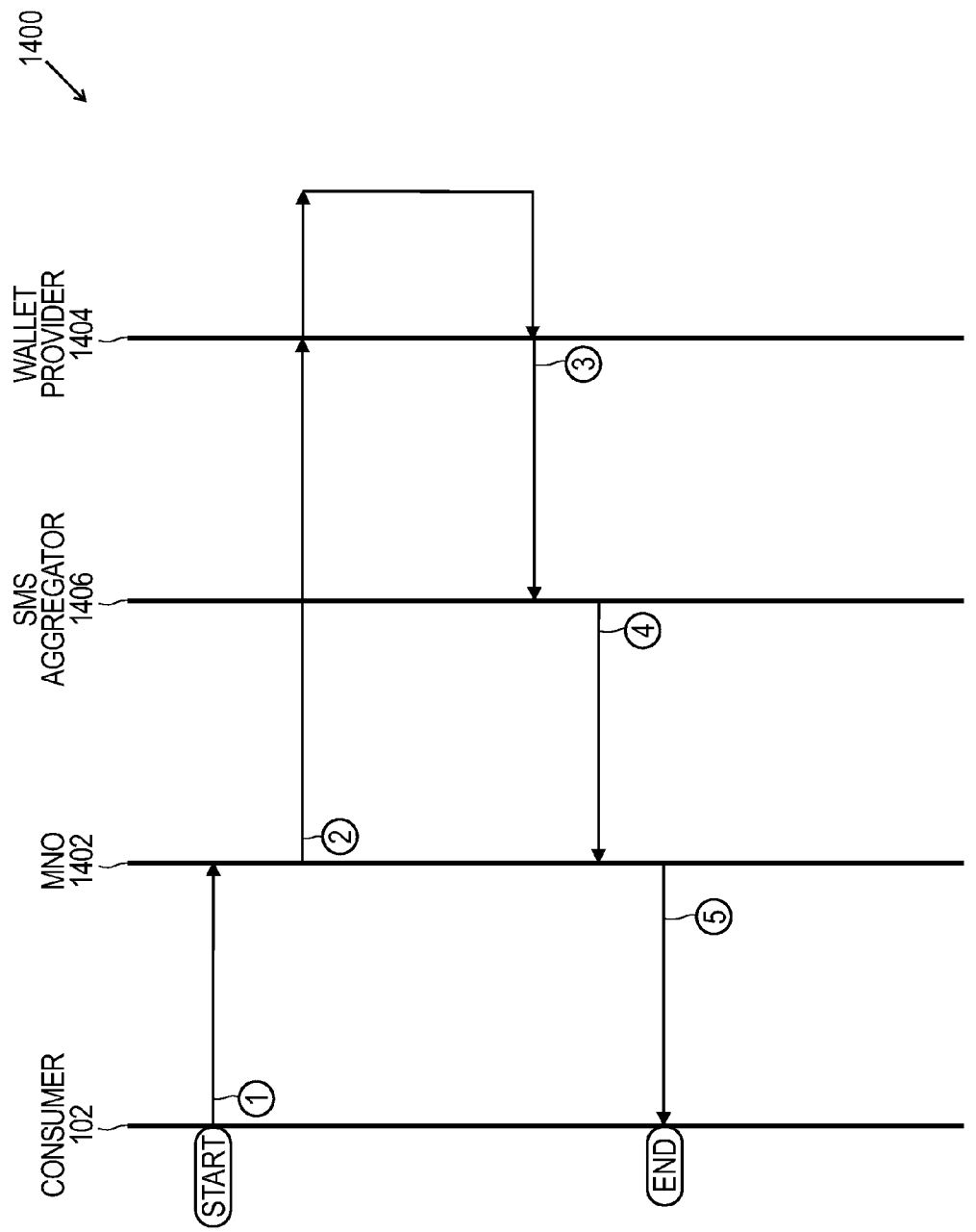
FIG. 14 is a flow diagram illustrating a mobile companion prepaid card customer service request process according to an embodiment of the disclosure.

FIG. 14 is a flow diagram illustrating a mobile companion prepaid card customer service request process 1400 according to an embodiment. Some jurisdictions may require that a mobile telephone customer service request process be available to enable consumers to easily access information that may help them to solve mobile companion prepaid card problems or issues that may arise from time to time. Thus, in some embodiments, in step 1 the Consumer or mobile companion prepaid cardholder requests customer service by transmitting, from his or her mobile device, a help request to the MNO 1402. In some embodiments, the help request includes a "Help" event name entered into a text box by the consumer, and also includes a consumer identifier (such as an mPIN). (Examples of event names include, but are not limited to, message successful/failure, Blocked (e.g., on a STOP list), Confirmation (of an opt in and/or opt out request), HELP, and API command.) The MNO 1402 verifies the consumer identifier and then forwards the SMS message to the wallet provider 1404, which uses the MSISDN and the event name to generate a predetermined help response. The help response may include a list of all commands that the consumer can utilize along with a list of customer service telephone numbers, and the like. The wallet provider then transmits the help response in step 3 to the SMS Aggregator 1406. The SMS aggregator in step 4 then utilizes the mobile number (MSISDN) provided in the help response to look up the cardholder's mobile network operator (MNO) 1402, a applies that MNO's mobile message rules, and in step 4 forwards the help response to the cardholder's MNO 1402. In step 5, the MNO 1402 then forwards the help response message to the consumer 102 for display on a display component of the consumer's mobile telephone.

Figure 15:
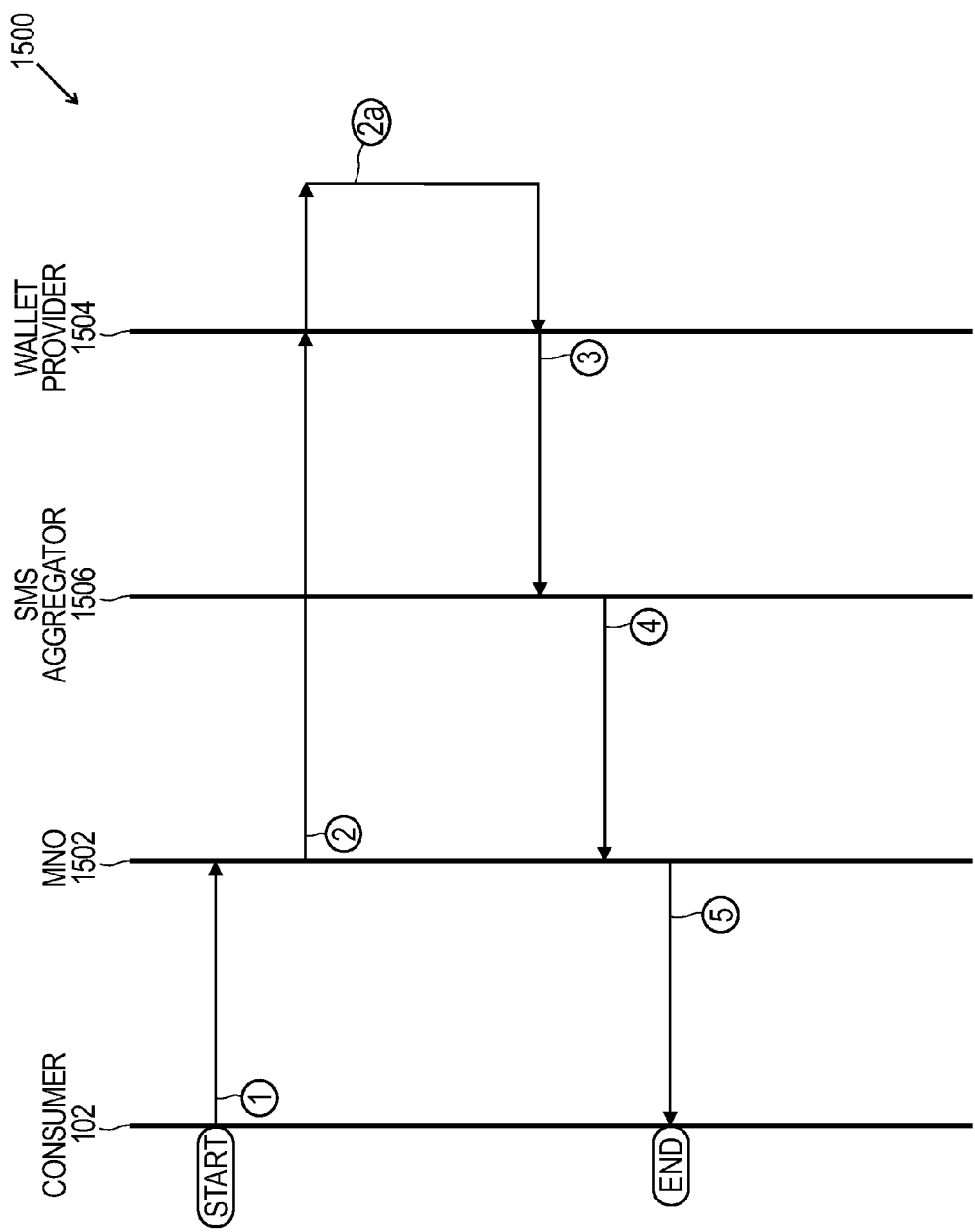
FIG. 15 is a flow diagram illustrating a mobile companion prepaid card marketing alert opt-out process according to an embodiment of the disclosure.

FIG. 15 is a flow diagram illustrating a mobile companion prepaid card marketing alert opt-out process 1500 according to an embodiment. Some jurisdictions may require a mobile telephone customer marketing opt-out request process to enable consumers to conveniently opt-out from receiving marketing alerts on his or her mobile telephone. Thus, in some embodiments, in step 1 the Consumer 102 or mobile companion prepaid cardholder requests to opt-out from marketing alerts by transmitting, from his or her mobile device, an opt-out request to the MNO 1502. In some embodiments, the opt-out request includes an "OPTOUT" event name entered into a text box by the consumer, and also includes a consumer identifier (such as an mPIN). The MNO 1502 verifies the consumer identifier and then in step 2 forwards the SMS message to the wallet provider 1504, which uses the MSISDN and the OPTOUT event name in step 2A to generate a command to provide an opt-out confirmation response. In step 3, the wallet provider 1504 then initiates an opt-out response confirming the change and transmits it to the SMS Aggregator 1506. The SMS aggregator in step 4 then utilizes the mobile number (MSISDN) provided in the help response to look up the cardholder's mobile network operator (MNO) 1402, applies that MNO's mobile message rules, and in step 4 transmits the opt-out confirmation response to the cardholder's MNO 1502. In step 5, the MNO 1502 then forwards the opt-out confirmation response message to the Consumer 102 for display on a display component of the consumer's mobile telephone.

The mobile companion prepaid card allows consumers to quickly, safely and reliably transfer money to family members, in addition to allowing consumers easy access to obtain cash from automatic teller machines (ATMs) and/or from agent locations. The mobile companion prepaid card also allows consumers to provide payment at POS terminals, at e-commerce merchant sites and at mail-order or telephone-order (MOTO) merchants. The payment functionality of a consumer's existing mobile money account is expanded by having the open-loop prepaid card, and convenience of use is increased as now the consumer has the ability to pay for purchases at millions of merchant acceptance locations worldwide.

Mobile companion prepaid card managers benefit by being able to offer a premium and an exciting new product that fits the aspirations of their consumer base, by obtaining incremental revenues and increased transactions, and by increased utilization and loyalty for their programs. In addition, a mobile companion prepaid card manager may also be able to obtain further incremental revenue from franchisees who offer the card to their customers.

Issuer financial institutions and MNOs may benefit from new revenues generated by the mobile prepaid companion card services from unbanked mobile consumers by driving a shift from traditional cash payment to digital payment.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
receiving, by a wallet provider computer from an agent device, an approval request for a mobile companion prepaid card for a consumer having a mobile wallet account;
determining, by the wallet provider computer, an issuer financial institution (FI) associated with the mobile companion prepaid card;
transmitting the approval request to an issuer FI processor associated with the issuer FI;
receiving, by the wallet provider computer from the issuer FI processor, an approval message;
transmitting, by the wallet provider to a mobile device of the consumer, the approval message and a request to provide cardholder verification method (CVM) data;
receiving the CVM data from the consumer's mobile device;
validating the CVM data;
transmitting, by the wallet provider computer to the issuer FI processor, a mobile companion prepaid card activation request;
receiving, by the wallet provider computer from the issuer FI processor, a confirmation message indicating activation of the mobile companion prepaid card; and
transmitting, by the wallet provider computer to the consumer's mobile device, a message confirming activation of the mobile companion prepaid card.

2. The method of claim 1, wherein the approval request comprises consumer information and mobile companion prepaid card information.

3. The method of claim 2, wherein the consumer information comprises at least two of Know Your Customer (KYC) information of the consumer, Office of Foreign Asset Control (OFAC) data, and a mobile telephone number associated with the consumer's mobile device.

4. The method of claim 2, wherein the mobile companion prepaid card information comprises a reference number.

5. The method of claim 4, wherein the reference number is a primary account number (PAN) for linking with a mobile wallet account number of the consumer.

6. The method of claim 1, wherein the mobile companion prepaid card comprises an un-embossed and un-personalized plastic form factor card.

7. The method of claim 6, wherein the mobile companion prepaid card comprise at least one of a primary account number (PAN) and a magnetic stripe.

8. The method of claim 6, wherein the mobile companion prepaid card comprises an integrated circuit (IC).

9. A system comprising:
an agent device operable by an agent to input consumer information and mobile companion prepaid card information;
a wallet provider computer comprising a closed-loop mobile money provider and configured for communicating with the agent device;
a plurality of issuer financial institution (FI) processors associated with issuer FIs and configured for communication with the wallet provider computer;
an short message service (SMS) aggregator computer configured for communication with the wallet provider computer; and
a plurality of mobile network operator (MNO) computers operable to communicate with the SMS aggregator computer;
wherein the wallet provider computer is configured to:
receive an approval request for a mobile companion prepaid card from the agent device for a consumer having a mobile wallet account;
determine an issuer financial institution (FI) associated with the mobile companion prepaid card;
transmit the approval request to the issuer FI processor;
receive an approval message from the issuer FI processor;
transmit the approval message and a request to provide cardholder verification method (CVM) data to a mobile device of the consumer;
receive the CVM data from the consumer's mobile device;
validate the CVM data;
transmit a mobile companion prepaid card activation request to the issuer FI processor;
receive a confirmation message from the issuer FI computer indicating activation of the mobile companion prepaid card; and
transmit a message to the consumer's mobile device confirming activation of the mobile companion prepaid card.

10. The system of claim 9, wherein the mobile companion prepaid card comprises an un-embossed plastic form factor card.

11. The system of claim 9, wherein the mobile companion prepaid card comprises a reference number to link to a mobile wallet closed-loop account number of the consumer.

12. The system of claim 10, wherein mobile companion prepaid card further comprises a magnetic stripe.

13. The system of claim 9, wherein the mobile companion prepaid card comprises an integrated circuit (IC).

14. A method comprising:
receiving, by a wallet provider computer from an issuer financial institution (FI) processor, a mobile companion prepaid card purchase authorization request including a purchase transaction amount;
verifying, by the wallet provider computer, the availability of funds of a closed-loop account linked to the mobile companion prepaid card;
authorizing the transaction when the funds of the closed-loop account are adequate to cover the purchase transaction amount;
debiting, by the wallet provider computer, the closed-loop account linked to the mobile companion prepaid card;
transmitting, by the wallet provider computer to the issuer FI processor, a purchase transaction authorization message to forward to a merchant device; and
transmitting, by the wallet provider computer to a mobile device of the consumer, the purchase transaction authorization message.

15. The method of claim 14, further comprising, subsequent to authorizing the transaction:
preparing a most recent closed-loop account balance; and
transmitting, by the wallet provider computer, the most recent closed-loop account balance message to the mobile device of the consumer.

16. A system comprising:
a wallet provider computer that is a closed-loop mobile money provider;
a plurality of issuer financial institution (FI) processor configured for communication with the wallet provider computer; and
a consumer mobile device;

wherein the wallet provider computer is configured to:
- receive a mobile companion prepaid card purchase authorization request including a purchase transaction amount from an issuer financial institution (FI) processor;
- verify the availability of funds of a closed-loop account linked to the mobile companion prepaid card;
- authorize the transaction when the funds of the closed-loop account are adequate to cover the purchase transaction amount;
- debit the closed-loop account linked to the mobile companion prepaid card;
- transmit a purchase transaction authorization message to the issuer FI processor to forward to a merchant device; and
- transmit the purchase transaction authorization message to the consumer mobile device.

17. The system of claim 16, wherein the wallet provider computer is further configured to:
- prepare a most recent account balance associated with the closed-loop account; and transmit the most recent account balance message to the consumer mobile device.

\* \* \* \* \*